US011042776B1

(12) United States Patent
Buhler et al.

(10) Patent No.: US 11,042,776 B1
(45) Date of Patent: Jun. 22, 2021

(54) DETERMINING SIMILARITY OF IMAGES USING MULTIDIMENSIONAL HASH VECTORS CORRESPONDING TO THE IMAGES

(71) Applicant: Zorroa Corporation, Berkeley, CA (US)

(72) Inventors: Juan Jose Buhler, Woodside, CA (US); Matthew Chambers, Tewksbury, MA (US)

(73) Assignee: Zorroa Corporation, Berkeley, CA (US)

( * ) Notice: Subject to any disclaimer, the term of this patent is extended or adjusted under 35 U.S.C. 154(b) by 124 days.

(21) Appl. No.: 16/395,129

(22) Filed: Apr. 25, 2019

Related U.S. Application Data

(60) Provisional application No. 62/662,729, filed on Apr. 25, 2018.

(51) Int. Cl.
| | | |
|---|---|---|
| *G06K 9/62* | (2006.01) | |
| *G06N 3/08* | (2006.01) | |
| *G06F 16/56* | (2019.01) | |
| *G06F 16/583* | (2019.01) | |
| *G06K 9/00* | (2006.01) | |

(52) U.S. Cl.
CPC ........... *G06K 9/6215* (2013.01); *G06F 16/56* (2019.01); *G06F 16/583* (2019.01); *G06K 9/00483* (2013.01); *G06K 9/6218* (2013.01); *G06K 9/6255* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2008/0201636 A1 | 8/2008 | Fujiwara | |
| 2018/0096201 A1 | 4/2018 | Bermundo | |
| 2018/0101742 A1* | 4/2018 | Burge | G06K 9/00926 |
| 2019/0171665 A1* | 6/2019 | Navlakha | G06F 16/532 |
| 2019/0213448 A1* | 7/2019 | Peng | G06K 9/6262 |

OTHER PUBLICATIONS

Buhler, Office Action, U.S. Appl. No. 16/395,151, dated Nov. 29, 2019, 13 pgs.
Buhler, Notice of Allowance, U.S. Appl. No. 16/395,151, dated May 8, 2020, 9 pgs.

* cited by examiner

*Primary Examiner* — Leon Flores
(74) *Attorney, Agent, or Firm* — Morgan, Lewis & Bockius LLP

(57) ABSTRACT

A method of searching for similar images is performed at a computing system having one or more processors and memory. The method includes receiving an input image having content, and generating a feature vector corresponding to the input image according to a trained classifier model. The feature vector has multiple components. The method further includes encoding the feature vector as a similarity hash by quantizing each component. The method also includes, for each reference image in a plurality of reference images: obtaining a reference hash for the reference image; computing similarity between the input image and the reference image by computing a distance between the reference hash and the similarity hash; and determining whether the computed distance is within a predetermined threshold. When the computed distance is within the predetermined threshold, the computing system returns the reference image as an image that is similar to the input image.

20 Claims, 39 Drawing Sheets

```
package com.zorroa.common.elastic;

import com.google.common.collect.Lists;
import org.apache.lucene.util.BytesRef;
import org.elasticsearch.index.fielddata.ScriptDocValues;
import org.elasticsearch.script.AbstractDoubleSearchScript;
import org.slf4j.Logger;
import org.slf4j.LoggerFactory;

import java.util.Collections;
import java.util.List;
import java.util.Map;

/**
 * Created by chambers on 11/6/16.
 */
public final class HammingDistanceScript extends AbstractDoubleSearchScript { private static final Logger logger =

LoggerFactory.getLogger(HammingDistanceScript.class); private static final double NORM =

100.0;

private String field;
    private String fieldDotRaw;
    private final List<String> charHashes;
    private final List<Float> weights;
    private int length = 0;
    private double minScore = 0;
    private int resolution;
    private final boolean header;
    private final char version;
    private final int dataPos;
    private final int numHashes;
    private final double possibleScore;
    private final double singleScore;

public HammingDistanceScript(Map<String, Object> params) {
        super();
        field = (String) params.get("field");
        if (field.endsWith(".raw")) {
            field = field.replaceAll("\\.raw$", "");
        }
        fieldDotRaw = field + ".raw";
        minScore = (int) params.getOrDefault("minScore", 1) / NORM;
        resolution = 15;

List<String> _hashes = (List<String>) params.get("hashes");
        List<Float> _weights = (List<Float>) params.get("weights");

if (_hashes == null) {
            throw new IllegalArgumentException(
                "Hashes cannot be null");
        }
```

Figure 10A

```
if (_weights == null) {
    _weights = Collections.nCopies(_hashes.size(), 1.0ف); } if (_hashes.size() != _weights.size()) {
    throw new IllegalArgumentException(
                "HammingDistanceScript weights must align with hashes");
}

/**
 * Go through all the values and remove the null
 * values and populate the charHashes and
 * weights fields with valid values.
 */
charHashes = Lists.newArrayList();
weights = Lists.newArrayList();
for (int i=0; i<_hashes.size(); i++) {
    String hash = _hashes.get(i);
    if (hash == null || hash.isEmpty()) {
        continue;
    }
    charHashes.add(hash);
    weights.add(_weights.get(i));
}

/**
 * If there are no valid hashes left, initialize to defaults
 */
if (charHashes.isEmpty()) {
    singleScore = possibleScore = numHashes = dataPos = version = 0;
    header = false;
    return;
}
else {
    /**
     * Use the first hash to determine if there is a header.
     */
    String hash = charHashes.get(0);
    header = hash.charAt(0) == '$';
    length = hash.length();
    numHashes = charHashes.size();

/**
     * TODO: more sophisticated header parsing.
     *
     * There are 2 fields every has leads with:
     * 1 char: version
     * 2 chars: position of data (called "headerSize" here)
     *
     * A version 0 hash has 1 field, resolution.
     */
    if (header) {
        version = hash.charAt(1);

// The start position of the data.
        dataPos = Integer.parseInt(hash.substring(2, 4), 16);
```

Figure 10B

```
            if (version <= 0) {
                // Resolution is the next byte.
                    resolution = Integer.parseInt(hash.substring(4, 6), 16);
            }
        } else {
            version = 0;
            dataPos = 0;
        }

// To get the proper score, we subtract header size from the length here.
        singleScore = resolution * (length - dataPos);
        possibleScore = singleScore * numHashes;
    }
}

/**
 * Returned if it is impossible to calculate a score
 */
private static final double NO_SCORE = 0;

@Override
public double runAsDouble() {
    ScriptDocValues.Strings strings;

if (doc().containsKey(fieldDotRaw)) {
        strings = docFieldStrings(fieldDotRaw);
    }
    else if (doc().containsKey(field)) {
        strings = docFieldStrings(field);
    }
    else {
        return NO_SCORE;
    } double score = charHashesComparison(strings.getBytesValue());
    return score >= minScore ? score : NO_SCORE;
} public final double charHashesComparison(BytesRef fieldValue) {
    double score = 0;
    if (possibleScore == 0) {
        return NO_SCORE;
    } if (fieldValue == null || fieldValue.length == 0) {
        return NO_SCORE;
    } byte ver = fieldValue.bytes[1];
    for (int i = 0; i < numHashes; ++i) {
        String hash = charHashes.get(i);
        if (hash == null) {
            continue;
        }
        if (header) {
```

Figure 10C

```
            if (ver != hash.charAt(i)) {
                continue;
            }
        }
        else {
            if (fieldValue.length != hash.length()) {
                continue;
            }
        }
        score += (weights.get(i) * hammingDistance(fieldValue, hash));
    }
    score = normalize(score);
    return score;
} public final double normalize(double score) {
    score = (score / possibleScore);
    return score;
} public final double hammingDistance(final BytesRef lhs, final String rhs) {
    double score = singleScore;
    for (int i = dataPos; i < length; i++) {
        score -= Math.abs(lhs.bytes[i] - rhs.charAt(i));
    }
    return score;
} public int getResolution() {
    return resolution;
}
public String getField() { return field; }
public int getNumHashes() {
    return numHashes;
}
}
```

Figure 10D

DETERMINING SIMILARITY OF IMAGES USING MULTIDIMENSIONAL HASH VECTORS CORRESPONDING TO THE IMAGES

CROSS REFERENCE TO RELATED APPLICATIONS

This application claims priority to U.S. Provisional Application Ser. No. 62/662,729, filed Apr. 25, 2018, entitled "Methods and Systems for Matching Still Images and Video Sequences," which is incorporated by reference herein in its entirety.

This application is related to U.S. patent application Ser. No. 16/395,151, filed Apr. 25, 2019, entitled "Digital Organization of Printed Documents According to Extracted Semantic Information," which is incorporated herein by reference in its entirety.

TECHNICAL FIELD

The disclosed implementations relate generally to matching an image with images in a reference library and more specifically to using hashing techniques to match the images.

BACKGROUND

Collections of visual media files (e.g., images and video) are growing in size and are often stored in multiple locations. Media repositories may exist on local storage for mobile and desktop devices, dedicated network-attached storage (NAS), or on remote cloud services. It is particularly difficult to search media files. Whereas textual queries can be matched to text content of ordinary documents, an image or video does not include text that can be directly matched. In addition, because of the vast quantity of media files, a manual scan of the media file universe is generally not productive. Furthermore, brute force approaches, such as performing OCR on an entire image, does not necessarily capture critical characteristics that would be relevant to a search query.

Similarly, even though information is increasingly digitized, documents continue to be printed (e.g., for offline review). There is also a large amount of legacy information that is only available in paper form. Old printed matter tends to be damaged and is not amenable to traditional scanning techniques. Moreover, organizing printed documents is particularly difficult due to the large number of document types. For example, a spreadsheet and a map that are printed and subsequently scanned together require very different analysis for digitization and organization.

SUMMARY

Disclosed implementations address the above deficiencies and other problems associated with managing or organizing media files and printed documents. The present disclosure is directed towards processes that provide visual insight, discovery, and navigation into collections of millions of media files and/or documents (e.g., printed office documents scanned as images). A user can search across an entire portfolio using textual queries, which are matched against semantic information extracted from the media files or printed documents.

In one aspect, a method of searching a system for similar images is provided. The method comprises receiving an input image having content. The method also comprises generating a feature vector corresponding to the input image according to a trained classifier model (e.g., a convolutional neural network (CNN)). The feature vector has a plurality of components. The method further comprises encoding the feature vector as a similarity hash by quantizing each component. The method further comprises, for each reference image in a plurality of reference images, performing a sequence of steps. The sequence of steps comprises obtaining a reference hash for the respective reference image, computing similarity between the input image and the respective reference image by computing a distance between the reference hash and the similarity hash, and determining if the computed distance is within a predetermined threshold. When the computed distance is within the predetermined threshold, the method returns the reference image as an image that is similar to the input image.

In some implementations, each feature vector component is represented using a floating-point number, and quantizing comprises mapping each component to a corresponding integer value of a predetermined length using a linear scale. In some implementations, a majority of the components range between the floating-point values 0.0 and 1.0. In some implementations, the method further comprises, prior to quantizing, clamping each component to a floating-point value between 0.0 and 1.0 (e.g., values less than 0.0 are treated as 0.0 and values greater than 1.0 are treated as 1.0). In some implementations, the predetermined length is 4 bits. In some implementations, encoding the feature vector further comprises concatenating the integer values to form a string (e.g., concatenate a 4-bit encoding for each feature). In some implementations, the method further comprises mapping each component to its corresponding integer value using a corresponding scale. In some implementations, a first integer value corresponding to a first component of the plurality of components has a length that is distinct from a second integer value corresponding to a second component of the plurality of components.

In some implementations, the computed distance is N-dimensional Manhattan distance (sum of absolute differences), where N is the number of components.

In some implementations, the content comprises one or more of: semantic content, color histogram content, facial features, words, audio content, and graphical content. In some implementations, the feature vector corresponds to one or more features of the content of the image.

In some implementations, the method further comprises, prior to receiving the input image, performing a sequence of steps for each reference image in the plurality of reference images. The sequence of steps includes generating a reference feature vector corresponding to the respective reference image according to the one or more trained classifier models. The reference feature vector has a plurality of reference components. The sequence of steps also includes encoding the reference feature vector as a reference similarity hash by quantizing each reference component, and associating the reference image with the reference similarity hash. According to some implementations, obtaining the reference hash for the respective reference image comprises retrieving the corresponding reference similarity hash for the respective reference image.

In some implementations, the method further comprises grouping the input image with one or more images of the plurality of reference images that are similar to the input image to form a cluster of images, and assigning a label to the cluster.

In some implementations, the method further comprises, prior to encoding the feature vector as the similarity hash, reducing the number of components in the plurality of components using a dimensionality-reduction technique.

In some implementations, the method comprises obtaining a plurality of hashes using a plurality of hashing techniques (each hash generated by a respective hashing technique), and combining the plurality of hashes to form the similarity hash. Computing similarity between the input image and the respective reference image comprises computing the distance between the reference hash and the combined similarity hash. In some implementations, the method further comprises, prior to combining the plurality of hashes, normalizing each hash. In some implementations, combining the plurality of hashes comprises weighting each hash to obtain the combined hash (i.e., a weighted linear combination). In some implementations, a first weight associated with a first hash is distinct from a second weight associated with a second hash.

In another aspect, a method is provided for analyzing and organizing printed documents (sometimes called printed office documents, or office documents). The method includes receiving one or more printed documents. Each printed document includes one or more pages. The method includes performing a sequence of steps for each printed document that includes, for each page of the respective printed document, scanning the respective page to obtain an image file.

The method also includes determining a document class for the respective page by applying one or more trained classifier models to the image file. In some implementations, the one or more trained classifier models are trained using printed office document pages from a first market segment, and the one or more printed documents belong to a second market segment that is distinct from the first market segment.

In some implementations, the method also includes retraining the one or more classifier models to classify documents for the second market segment by performing a sequence of steps. The sequence of steps includes generating a confidence value based on a successful classification of a set of documents from the second market segment. Each document in the set of documents has a known document class. The method determines whether the confidence value exceeds a predetermined threshold. When the confidence value does not exceed the predetermined threshold, the method continues to train the one or more classifier models with documents from the second market segment until the confidence value exceeds the predetermined threshold.

The method also includes generating a semantic analyzer pipeline for analyzing the respective page based on the document class. The semantic analyzer pipeline includes (i) a preprocessing semantic analyzer to preprocess the respective page, and (ii) an optical character recognition (OCR)-based semantic analyzer to process the output of the preprocessing semantic analyzer.

The method also includes generating a preprocessed output page by applying the preprocessing semantic analyzer to the image file. In some implementations, generating the preprocessed output page includes estimating the scan quality for the scanned image, and adjusting print attributes, including contrast, for the scanned image. In this way, the method obtains the preprocessed output page by determining a distribution of brightness across the scanned image. In some implementations, generating the preprocessed output page includes determining the document layout for the respective page, subdividing the scanned image into a plurality of image sections based on the document layout, and combining the plurality of image sections to obtain the preprocessed output page.

In some implementations, generating the preprocessed output page includes subdividing the scanned image into a plurality of partially overlapping image tiles, and combining the plurality of partially overlapping image tiles to obtain the preprocessed output page.

In some implementations, the method further includes determining whether textual data is split between a first partially overlapping image tile and a second partially overlapping image tile by performing an OCR process on each partially overlapping image tile. When the textual data is split, the method uses text location information provided by the OCR process to reconstruct the first partially overlapping image tile to include the textual data and to reconstruct the second partially overlapping image tile to remove the textual data.

In some implementations, when the OCR-based semantic analyzer does not handle text running in different directions, the method further includes scanning each partially overlapping image tile a plurality of times to obtain a plurality of versions of the respective partially overlapping image tile. Each time the method rotates the respective partially overlapping image tile by a predetermined angle and obtains a respective version of the partially overlapping image tile corresponding to a respective orientation. The method combines the plurality of versions of each partially overlapping image tile to obtain the preprocessed output page.

In some implementations, the method further includes determining that the respective page is a transparency. When the respective page is a transparency, the method includes performing a sequence of steps. The sequence of steps includes scanning a first side of a respective partially overlapping image tile to obtain a first version of the respective partially overlapping image tile. The sequence of steps includes scanning the second side of the respective partially overlapping image tile by reversing the respective partially overlapping image tile to obtain a second version of the respective partially overlapping image tile. The second side is opposite to the first side. The sequence of steps also includes determining if the first version has useful text by performing an OCR process on the first version and comparing the output of the OCR process with words from a dictionary of common words. The sequence of steps also includes, when the first version has useful text, reconstructing the respective partially overlapping image tile based on the first version. The sequence of steps also includes, when the first version does not have useful text, reconstructing the respective partially overlapping image tile based on the second version.

The method also includes extracting semantic information corresponding to the respective page by applying the OCR-based semantic analyzer to the preprocessed output page.

In some implementations, the OCR-based semantic analyzer comprises an OCR process and a geographic taxonomy analyzer, and extracting the semantic information includes a sequence of steps. The sequence of steps includes generating a plurality of OCR polygons by applying the OCR process to the preprocessed output page. The sequence of steps also includes processing the plurality of OCR polygons by the geographic taxonomy analyzer to (i) identify geographic location data in one or more OCR polygons of the plurality of OCR polygons, and (ii) encode the identified geographic data in the extracted semantic information. In some implementations, the sequence of steps also includes determining whether the document class corresponds to a map with a key.

When the document class corresponds to a map with a key, the method locates the respective printed document on a map based on the encoded geographic data in the extracted semantic information.

In some implementations, the OCR-based semantic analyzer comprises an OCR process and a spreadsheet analyzer (e.g., a CNN trained on spreadsheet data to identify and extract business information from the preprocessed output page), and extracting the semantic information includes a sequence of steps. The sequence of steps includes generating a plurality of OCR polygons by applying the OCR process to the preprocessed output page. The sequence of steps also includes processing the plurality of OCR polygons by the spreadsheet analyzer to (i) identify a plurality of spreadsheet data cells in the plurality of OCR polygons, and (ii) encode the plurality of spreadsheet data cells in the extracted semantic information. In some implementations, the sequence of steps also includes determining whether the document class corresponds to a spreadsheet. When the document class corresponds to a spreadsheet, the method: (i) classifies each encoded spreadsheet data cell in the extracted semantic information as either a formula or text; and (ii) processes each encoded spreadsheet data cell based on its classification as a formula or text to correct one or more errors in the respective encoded spreadsheet data cell.

The method also includes determining the digital organization for the respective printed document based on the extracted semantic information and the document class corresponding to respective pages of the respective printed document. In some implementations, the method further includes determining one or more categories for the one or more printed documents based on the extracted semantic information and the document class corresponding to each page of each printed document. The method assigns a category to each printed document based on the extracted semantic information and the document class corresponding to the respective printed document. The method then determines the file organization (e.g., organizing the documents into a hierarchy of folders or directories) for the one or more printed documents based on the respective category of each printed document.

In some implementations, the method includes, after receiving the one or more printed documents, concurrently scanning each page of each printed document in parallel to obtain a plurality of scanned image files. Each scanned image file corresponds to a respective page of a respective printed document. In some implementations, one or more marker pages (e.g., blank pages) are inserted between each pair of printed documents prior to concurrently scanning each document. The method also includes associating each scanned image file with its corresponding respective page of the respective printed document. In some implementations, associating each scanned image file with its corresponding respective page comprises identifying the one or more marker pages as potential boundaries for a logical grouping of one or more pages. In some implementations, associating each scanned image file with its corresponding respective page comprises performing an OCR process on the respective scanned image along a predetermined portion of the respective scanned image, thereby identifying a page number corresponding to the respective page and using the page number to associate the respective scanned image with its corresponding respective page of the respective printed document. The method also includes, for each printed document, performing a sequence of steps. The sequence of steps includes, for each page of the respective printed document, determining a document class for the respective page by applying one or more trained classifier models to the respective scanned image file associated with the respective page. The method also includes determining a digital organization for the respective printed document based on the extracted semantic information and the document class corresponding to respective pages of the respective printed document.

In accordance with some implementations, an electronic device has one or more processors and memory storing one or more programs executable by the one or more processors. The one or more programs include instructions for performing any of the methods described herein.

In accordance with some implementations, a non-transitory computer-readable storage medium has one or more processors and memory storing one or more programs executable by the one or more processors. The one or more programs include instructions for performing any of the methods described herein.

BRIEF DESCRIPTION OF THE DRAWINGS

FIGS. 10A-10D provide source code for a Hamming/Manhattan distance plugin in accordance with some implementations.

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
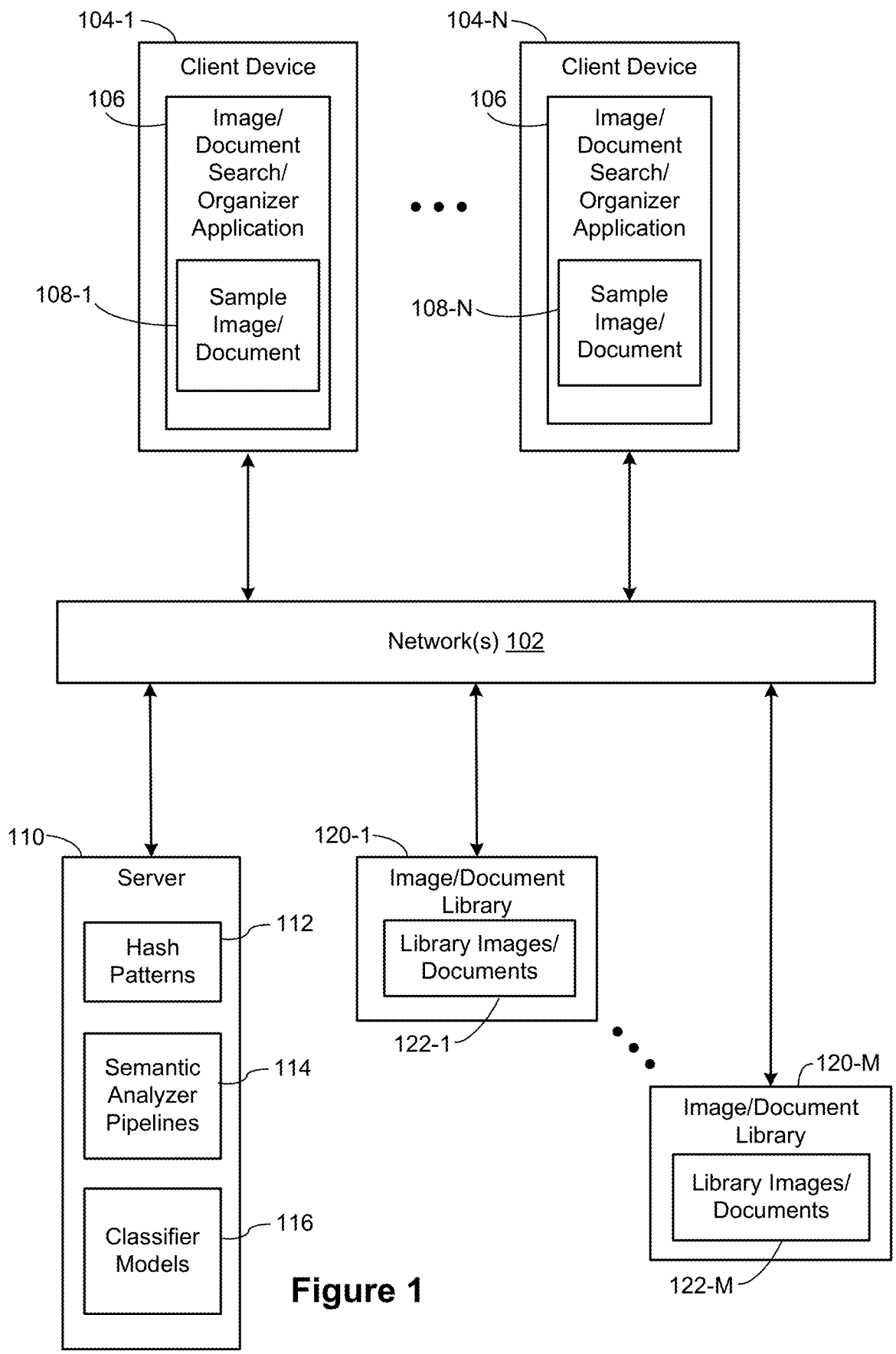
FIG. 1 is a block diagram of a context in which some implementations operate.

FIG. 1 illustrates a context in which some implementations operate. Image or document libraries 120 (e.g., libraries 120-1 to 120-M) store library of images or documents 122 (e.g., library images or documents 122-1 to 122-M). A typical image or document library 120 stores millions of images (or documents) or more. In some implementations, the images in library images are photos or media files corresponding to an original set of film (e.g., pictures including multiple takes of a scene). In some implementations, the images in library images are scanned images of documents (e.g., printed office documents).

In the illustrated implementation, there is a separate server 110, which stores information about the library of images or documents 122 in the image or document libraries 120. In some implementations, the server 110 stores one or more image or document libraries 120, but typically the server 110 is distinct from the image or document libraries 120. The server 110 stores and/or computes a set of hash patterns 112, a set of semantic analyzer pipelines 114, and/or classifier models 116 and related information. Each hash pattern is computed and used to match sample images or documents 108 with corresponding library images or documents 122. Similarly, a semantic analyzer pipeline is generated for each document 108 and used to match sample documents 108 with corresponding library documents 122. The classifier models 116 include classifiers (e.g., CNNs) that are trained to classify a plurality of documents.

The hash patterns 112, the semantic analyzer pipelines 114, and/or the classifier models 116 at the server 110, as well as the image or document libraries 120, are accessed by client devices 104 (e.g., the client devices 104-1 to 104-N) running a search or organizer application 106. When a user selects (e.g., inputs for search) a sample image or document 108 (e.g., sample images or documents 108-1 to 108-N), the retrieval module 226 (at the client device 104 or the server 110) retrieves the relevant library images or documents 122 or identification of the relevant library images or documents 122. The relevant images or documents are identified based on matching hash patterns 112, and the server returns the result set to the client device 104. For printed documents, the semantic analyzer pipelines 114 are used for semantically analyzing content of the documents to organize the documents. The communication between the client devices 104, the server 110, and the image or document libraries 120 is over one or more networks 102, such as local networks and the Internet.

In some implementations, some or all of the functionality described with respect to the server 110 is performed by the client device 104.

Figure 2:
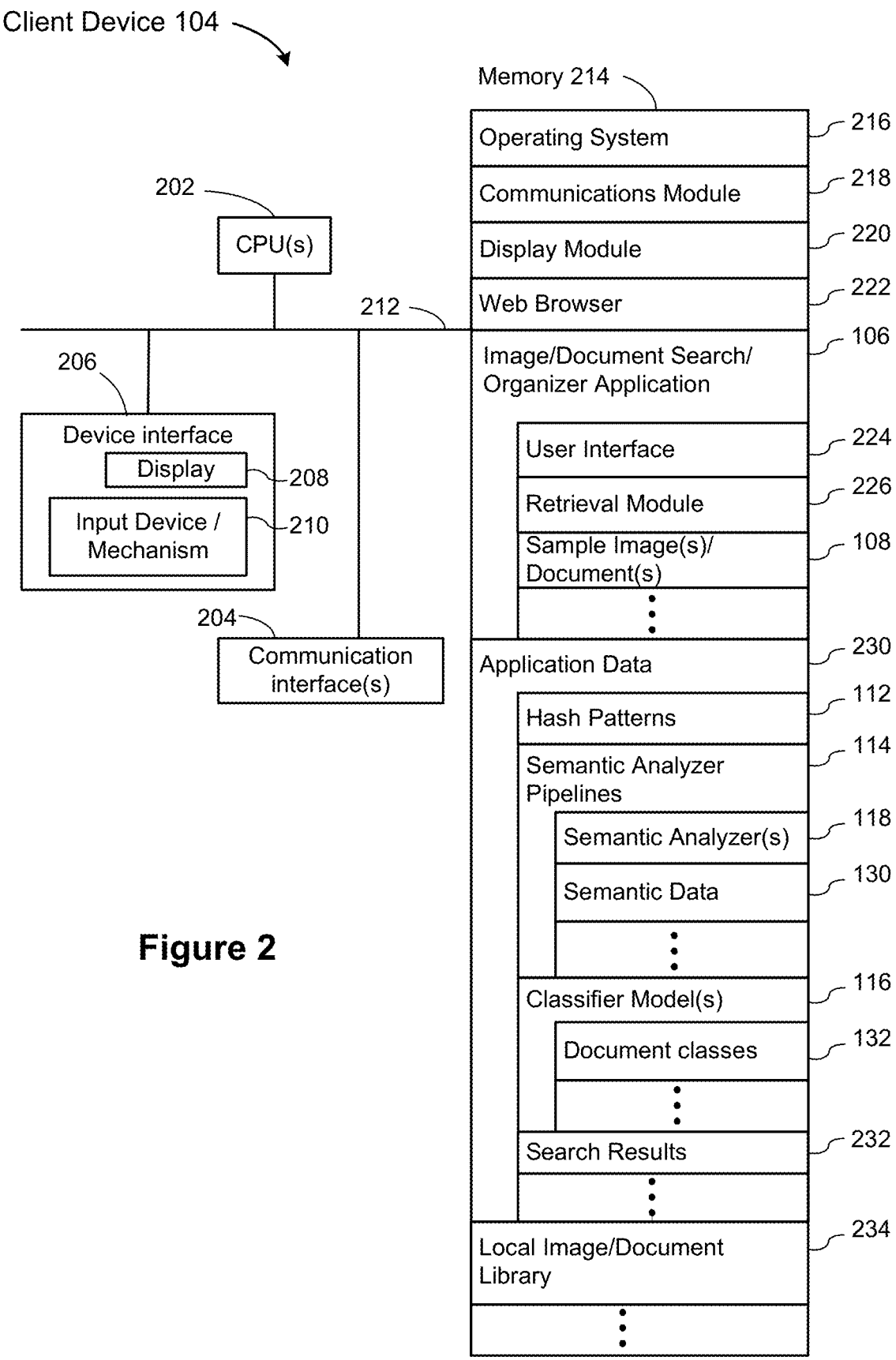
FIG. 2 is a block diagram of a client device in accordance with some implementations.

FIG. 2 is a block diagram illustrating a client device 104 that a user uses to access a search or organizer application 106. A client device is also referred to as a computing device, which may be a tablet computer, a laptop computer, a smart phone, a desktop computer, a PDA, or other computing device than can run the search or organizer application 106 and has access to a communication network 102. A client device 104 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 104 includes a device interface 206 comprising a display device 208 and one or more input devices or mechanisms 210. In some implementations, the input device or mechanism includes a keyboard and a mouse. In some implementations, the input device or mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 104 to other computers and devices via the one or more communication network interfaces 204 (wired or wireless) and one or more communication networks 102, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 102 (such as the Internet) with remote computers or devices;
- an image or document search or organizer application 106, which enables a user to search and retrieve, or organize images or documents from one or more remote image or document libraries 120 and/or a local image or document library 234. The search or organizer application 106 provides a user interface 224. The image or document search application 106 also includes a retrieval module 226, which retrieves images or documents corresponding to a match identified by the server 110. The image or document search application 106 accesses one or more sample images or documents 108, which can be selected and/or identified by a user to be the basis for the search (e.g., to match the sample image or document 108 with one or more images or documents in remote image or document libraries 120 or a local image or document library 234). In some implementations, the sample image clip or document 108 is selected from (e.g., stored in) the local image or document library 234. In some implementations, the organizer application 106 is used to automatically organize a set of documents in the document library 234; and application data 230, which includes a set of hash patterns 112, semantic analyzer pipelines 114, and/or classifier models 116, as computed by the server 110, and search results 232 corresponding to a matched image or document from the remote video libraries 120. In some implementations, the semantic analyzer pipelines 114 include semantic analyzers 118 and/or semantic data 130. In some implementations, the classifier models 116 include one or more document classes 132 determined by the classifier models 116. The search results 232 can include the matched image or document and/or identifying information corresponding to the matched image or document (e.g., a time frame, a set of keywords, and a location where the matched image or document is stored within the image or document library).

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a client device 104, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
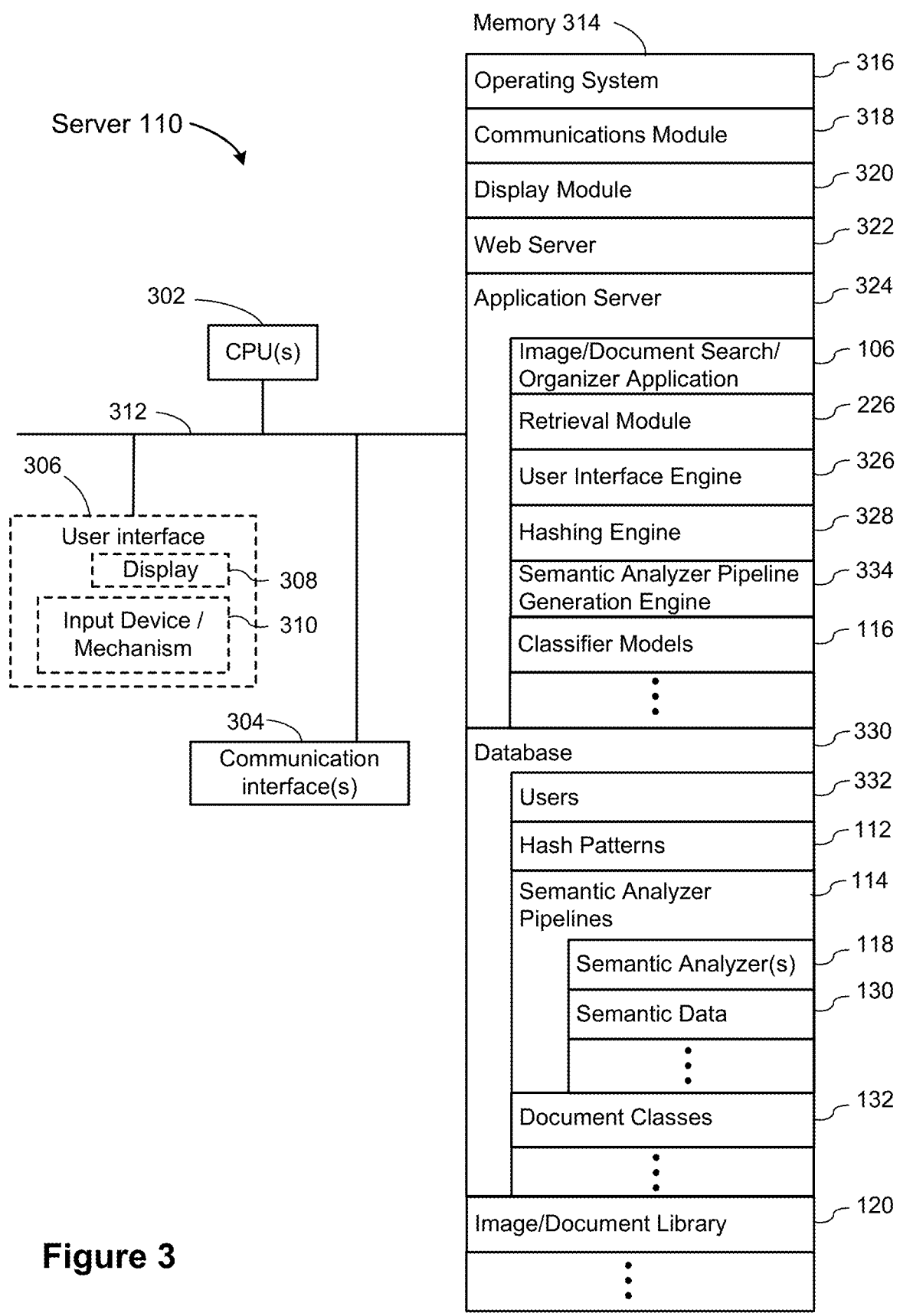
FIG. 3 is a block diagram of a server in accordance with some implementations.

FIG. 3 is a block diagram illustrating a server 110. In some implementations, the server 110 is one of a plurality of servers in a server system. A server 110 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, the server 110 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory devices within the memory 314, comprises a non-transitory computer readable storage medium. In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the server 110 to other computers via the one or more communication network interfaces 304 (wired or wireless) and one or more communication networks 102, such as the Internet, other wide area networks, local area networks, metropolitan area networks, and so on;
- a display module 320, which receives input from one or more input devices 310, and generates user interface elements for display on a display device 308;
- one or more web servers 322, which receive requests from client devices 104, and return responsive web pages, resources, or links. In some implementations, each request is logged in the database 330;
- one or more application servers 324, which provide various applications (such as an image or document search or organizer application 106) to the client devices 104. In some instances, applications are provided as a set of web pages, which are delivered to the client devices 104 and displayed in a web browser 222. The web pages are delivered as needed or requested. In some instances, an application is delivered to a client device 104 as a download, which is installed and run from the client device 104 outside of a web browser 222;
- in some implementations, the application server provides a retrieval module 226 as part of the image or document search or organizer application 106. In other implementations, the retrieval module 226 is a separate application provided by the application server 324. The retrieval module retrieves images or documents (e.g., from the image or document libraries 120) corresponding to search results identified based on the hash patterns 112;
- some implementations include a user interface engine 326, which provides the user interface 224 for users of the image or document search or organizer application 106;
- some implementations include a hashing engine 328, which computes hash patterns using a variety of hashing techniques and/or classifier models (e.g., convolutional neural networks (CNNs));
- some implementations include a semantic analyzer pipeline generation engine 334 to generate one or more semantic analyzer pipelines 114 (e.g., a pipeline including a preprocessing semantic analyzer to preprocess a document page and an optical character recognition (OCR)-based semantic analyzer to process the output of the preprocessing semantic analyzer);
- one or more databases 330, which store various data used by the modules or programs identified above. In some implementations, the database 330 includes a list of authorized users 332, which may include user names, encrypted passwords, and other relevant information about each user. The database 330 also stores the computed hash patterns 112. In some implementations, the database 330 also stores the semantic analyzer pipelines 114 (e.g., a preprocessing semantic analyzer and an optical character recognition (OCR)-based semantic analyzer that includes a conventional OCR process). In some implementations, the pipelines 114 includes one or more semantic analyzers 118 and/or semantic data 130. In some implementations, the semantic analyzer pipelines 114 store an association between one or more semantic analyzers and one or more printed documents. In some implementations, the database 330 stores one or more document classes 132 as determined by the classifier models 116; and in some cases, the server 110 includes an image or document library 120, which contains library images or documents 122 to be matched to the sample images or documents 108 selected by the client device 104.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise rearranged in various implementations. In some implementations, the memory 314 stores a subset of the modules and data structures identified above. Furthermore, the memory 314 may store additional modules or data structures not described above.

Although FIG. 3 illustrates a server 110, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a search application may be shared between a client device 104 and a server system 110. In some implementations, after the search application is installed on a client device 104, the majority of the subsequent processing occurs on the client device. For example, the hash patterns 112 may be stored solely at the client device 104, and not on a server 110. In other implementations, the majority of the processing and data storage occurs at a server 110, and the client device 104 uses a web browser 222 to view and interact with the data. For example, the hash patterns 112 may be stored only at the server system 110. One of skill in the art recognizes that various allocations of functionality between the client device 104 and the server system 110 are possible, and some implementations support multiple configurations (e.g., based on user selection).

Semantic Similarity Search

Some implementations perform semantic similarity search by storing a "similarity hash" for every asset (e.g., an image file) in a database, and subsequently comparing distance between two images in a hash space to determine image similarity. In some implementations, a similarity hash is an array of numbers, represented as a vector or as a string, that is designed to have small variations for images that are similar to each other. In this way, small distances in hash space between two images mean that the two images are "similar" to each other. Two images are considered "similar" depending on how the hash is constructed. For example, a simple hash can be constructed by encoding the colors used by each image. With this kind of hash, small distances mean that the images contain similar colors. A more complex hash includes a semantic hash. In some implementations, a semantic hash is made out of the feature vector of a Convolutional Neural Network. These vectors have typically 2048 or 4096 dimensions, and represent activations for specific arrangements of features found by the CNN. For a semantic hash, small distances can mean that the images represent similar concepts.

Clustering in Hash Space

A set of similarity hashes (each hash belonging to a respective image) can be visualized as a cloud of points in space. The dimensionality of the space is given by the number of dimensions of a hash. For a semantic hash, for example, if the number of dimensions is 2048, the dimensionality of the hash space is 2048, according to some implementations. In some implementations, given this cloud of points, hashes representing similar concepts are clustered together in groups. The density of each group depends on the similarity between the images within the respective group. Some implementations automate grouping of images using these clusters, and label each image according to its cluster. Thus, some implementations perform an initial curation of a set of images in an automatic manner.

Sample Algorithm for Similarity Search

An example algorithm includes a first pass that consists of computing similarity hashes (e.g., by a processor during an image import stage) for each image in a set of images. Some implementations reduce the dimensionality using either Principal Component Analysis (PCA), t-Distributed Stochastic Neighbor Embedding (t-SNE), or a combination of both techniques. Some implementations use PCA for low frequency changes in the similarity hash distribution. Some implementations use t-SNE, which preserves local clustering of points.

Figure 4A:
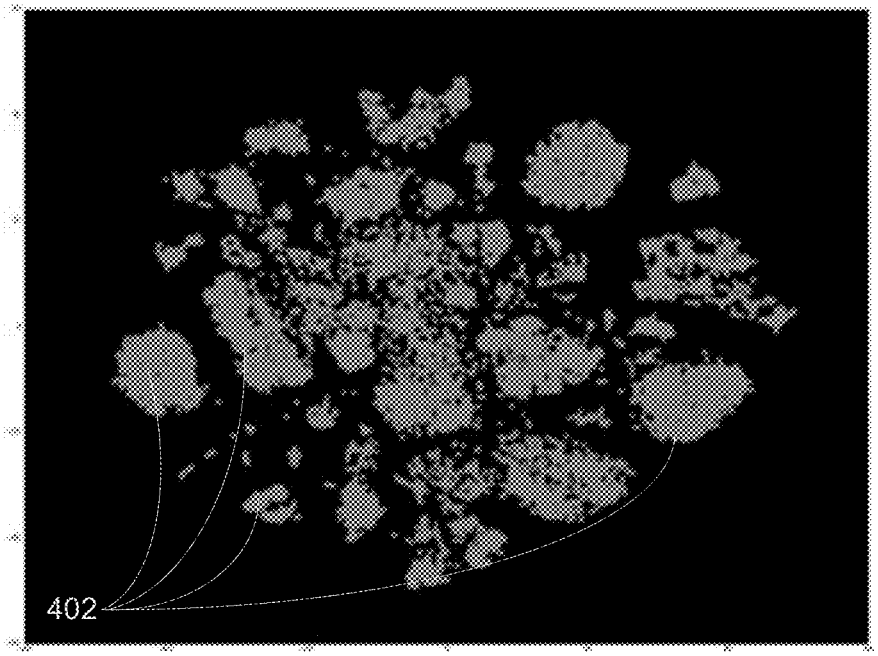
FIGS. 4A-4E illustrate automatic clustering of visual assets, according to some implementations.

FIGS. 4A-4E illustrate automatic clustering of visual assets, according to some implementations. FIG. 4A is an example illustration of a set of 19,000 real estate documents represented as similarity hashes and plotted in the plane (shown as grey dots 402) using t-SNE, according to some implementations. After obtaining a distribution of points in a 2-D or 3-D space, some implementations determine meaningful clusters of the points. Some implementations plot points in 4 or more dimensions. Some implementations use k-means clustering, which divides the points into a predetermined number of similarly-sized clusters. In some implementations, the clusters are convex, and ignore the local density of points.

Figure 4B:
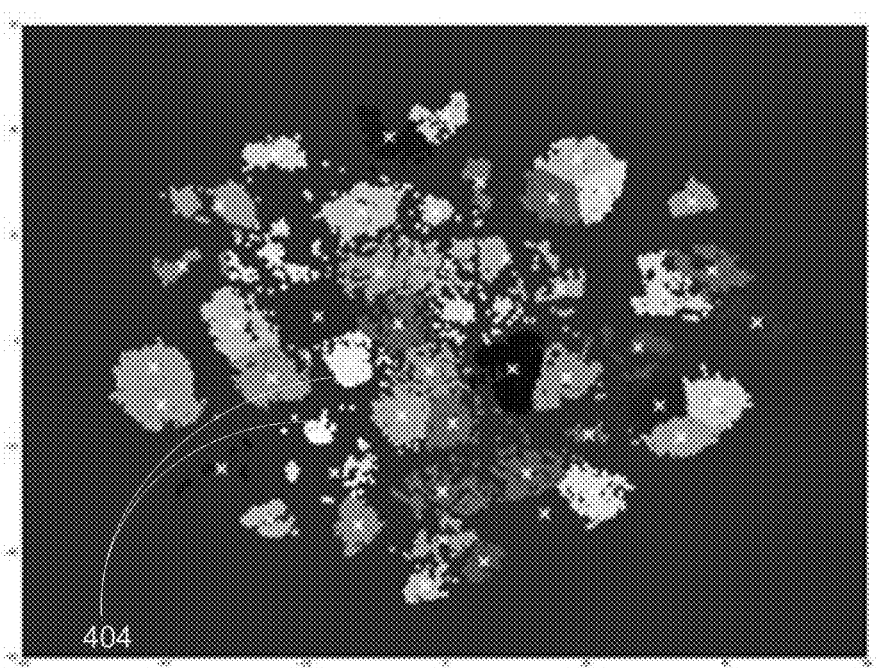

FIG. 4B illustrates clustering the set of points shown in FIG. 4A, performed using k-means clustering, according to some implementations. As shown (by the distribution of white dots 404), some of the groups are incorrectly divided into more than one cluster. Some implementations use other clustering algorithms, such as DBscan or HDBscan, which use the local point density to determine clusters, and thereby provide a better grouping of the points.

Figure 4C:
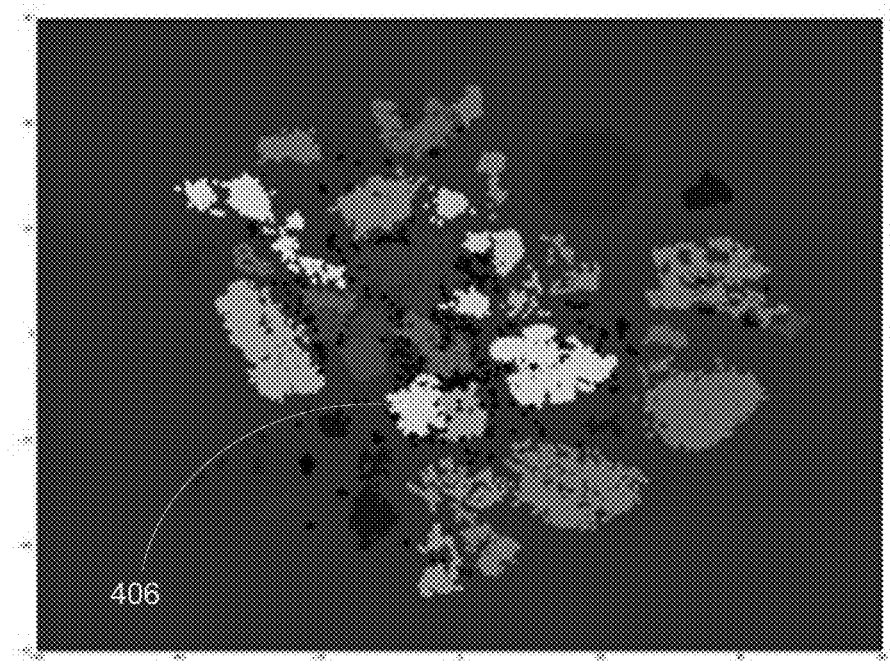

FIG. 4C illustrates clustering performed using HDB scan, according to some implementations. Relative to the grouping (or clustering) in FIG. 4B, some groups of points (e.g., some white dots 406) in the plane fall into the same cluster.

In some implementations, once the hashes or points are clustered, each asset (e.g., an image in the database) is assigned a cluster identifier. As a result, each asset is automatically grouped into categories, without a priori knowledge of the categories (e.g., the number of categories, and the number of assets in each category is unknown to begin with).

Higher Order Clustering

Figures 1, 4D:
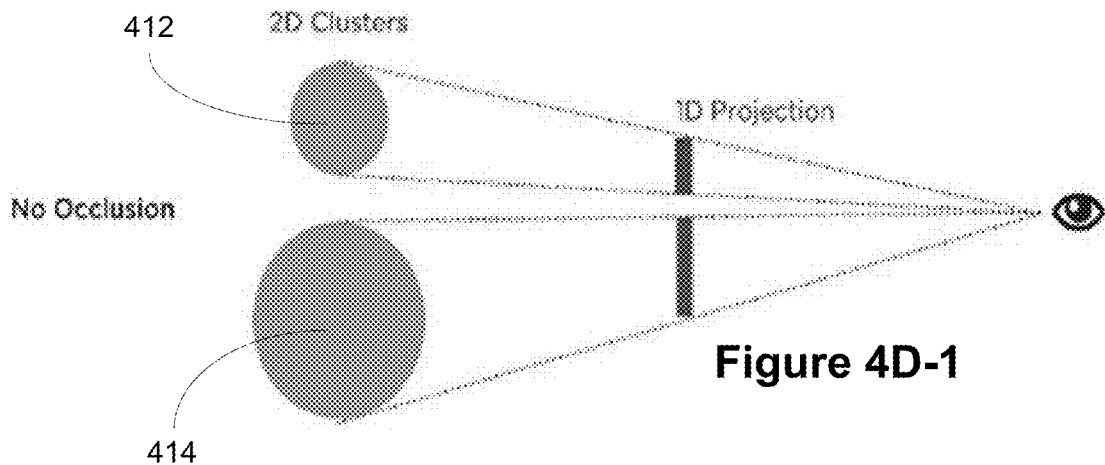
Figures 2, 4D:
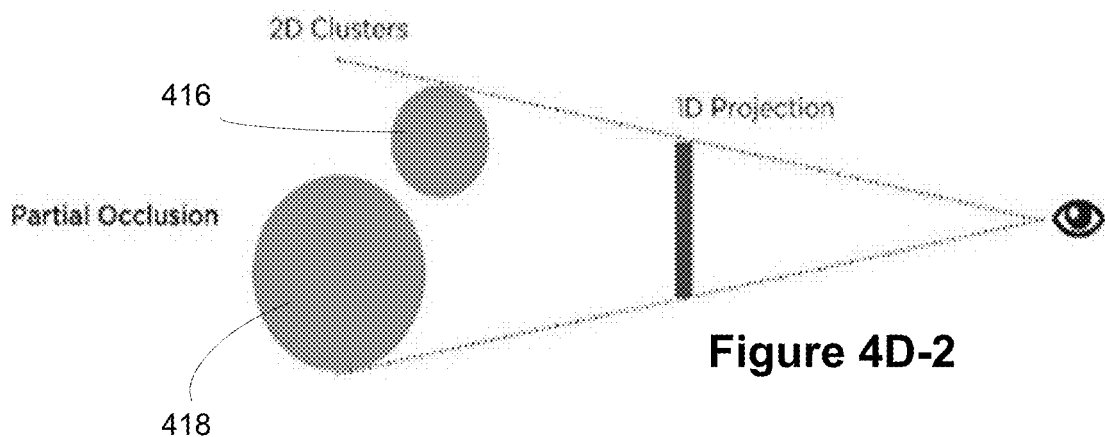
Figure 4E:
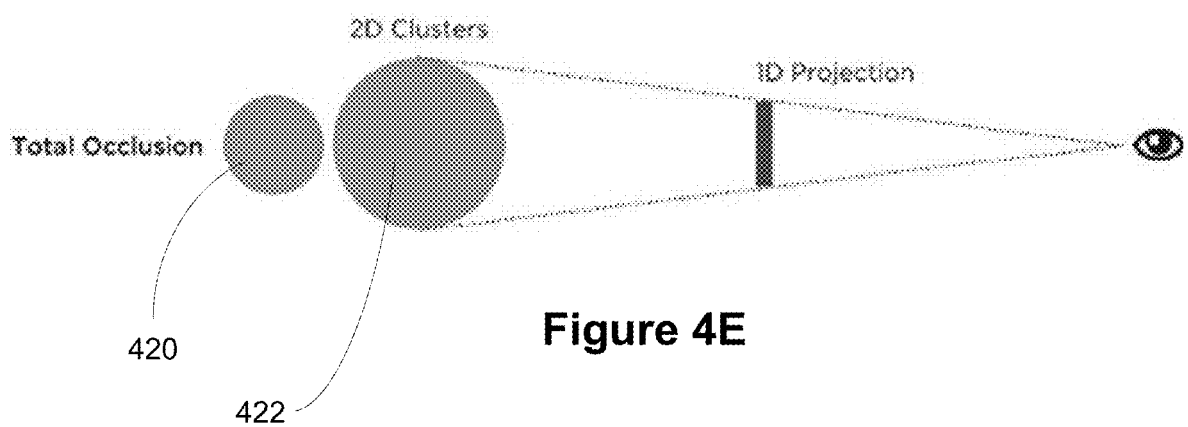

Some implementations improve cluster quality by performing the clustering in a higher-dimensional native hash dimension, rather than in a two- or three-dimensional hash space. With t-SNE clustering, for example, if projections are performed prior to clustering, clusters can overlap, resulting in multiple groups being accidentally merged together. This is similar to the visibility problem when projecting a three-dimensional scene onto a two-dimensional film or CCD, where objects near the camera obscure objects further from the camera. The two groups intersect in the projected space, making it difficult to separate the two groups. FIGS. 4D-1, 4D-2, and 4E provide examples where projective clustering fails due to occlusion, or overlap, during the projection. In FIG. 4D-1 there is no occlusion because the projection of the gray oval-shaped clusters 412 and 414 do not overlap. Visual analysis therefore shows no overlap. In FIG. 4D-2, however, there is partial occlusion because the projection of the two gray oval-shaped clusters 416 and 418 cannot be distinguished completely. In FIG. 4E, due to total occlusion, the larger circle 422 representing a 2-D cluster completely blocks the smaller circle 420 representing another 2-D cluster.

PCA Clustering

Figure 4F:
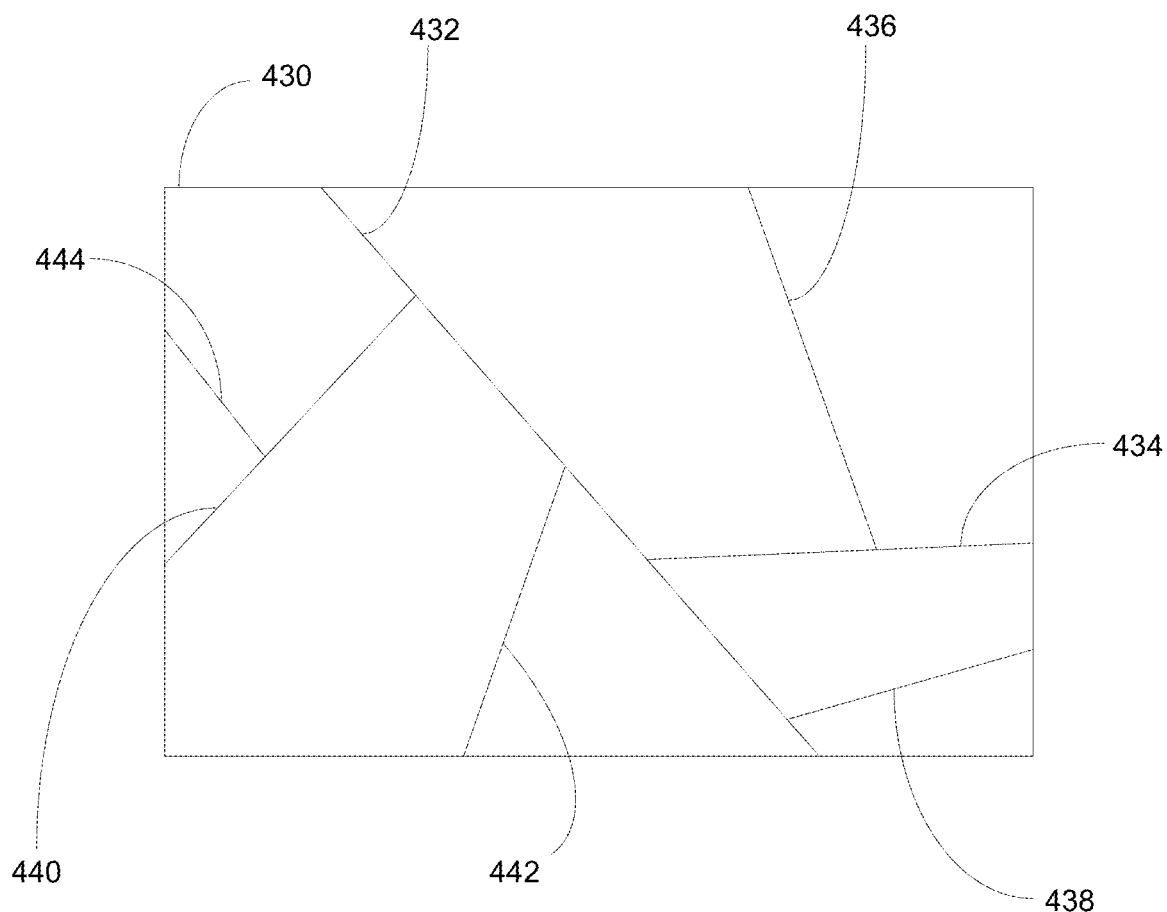
FIG. 4F illustrates Recursive N-Dimensional PCA Clustering, according to some implementations.

Some implementations use Principal component analysis (PCA) to perform higher-order clustering. Some implementations compute an optimal N-dimensional plane for projecting a data set onto a plane, divide the set into N clusters of the points on that plane, and then recursively subdivide each of the clusters by performing PCA on that subset (e.g., by clustering and then iterating the process). Some implementations do not perform dimensional reduction, and instead segment the data, and recursively apply PCA to the subset until the data can no longer be subdivided. FIG. 4F illustrates Recursive N-Dimensional PCA Clustering, according to some implementations. Initially, a cluster of points or hashes 430 is identified. Each step (indicated as 432, 434, . . . , 444) corresponds to a sub-division of a cluster of points (or hashes) into two sub-clusters, according to some implementations.

Cluster Naming

Figure 4G:
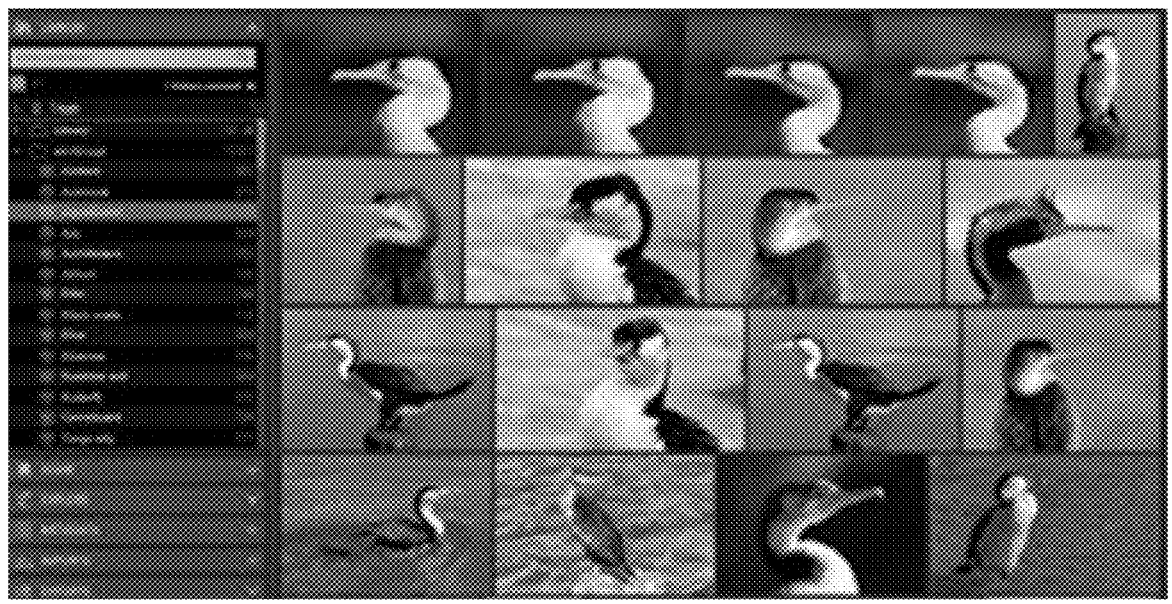
FIGS. 4G and 4H illustrate examples of automatic cluster naming, according to some implementations.
Figure 4H:
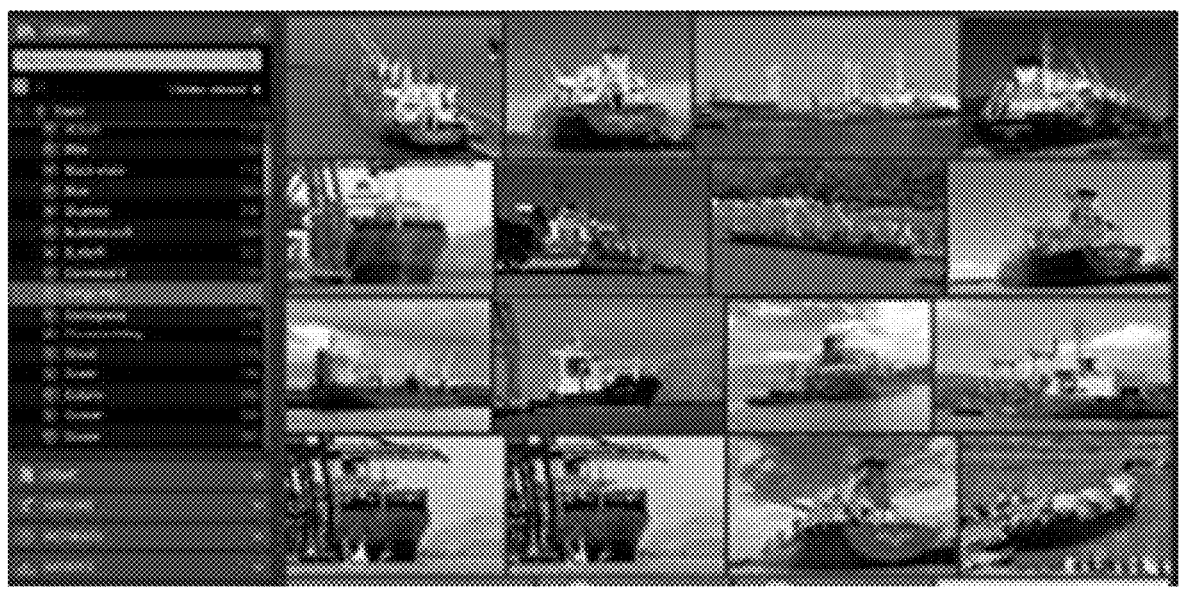

Some implementations automatically assign meaningful names to the clusters obtained by any of the clustering methods. Some implementations compute keywords (e.g., using a CNN classifier) in addition to computing similarity hashes. For example, for a collection of photographs, some implementations compute similarity hashes using one of the techniques described herein, and compute keywords using a CNN classification technique. Some implementations determine names for clusters using a voting mechanism. For example, each member of a cluster votes on what the cluster name should be. By counting the number of times a given keyword is used within the cluster, a popular keyword is selected as the cluster name. Thus, some implementations automatically select a set of labels for a group of assets (e.g., image files). FIGS. 4G and 4H illustrate examples of automatic cluster naming, according to some implementations. Some implementations select the label "Aquatic Bird" for the set of images in FIG. 4G, and select the label "Cargo Ship" for the set of images in FIG. 4H.

Cluster Visualizer

Figure 4I:
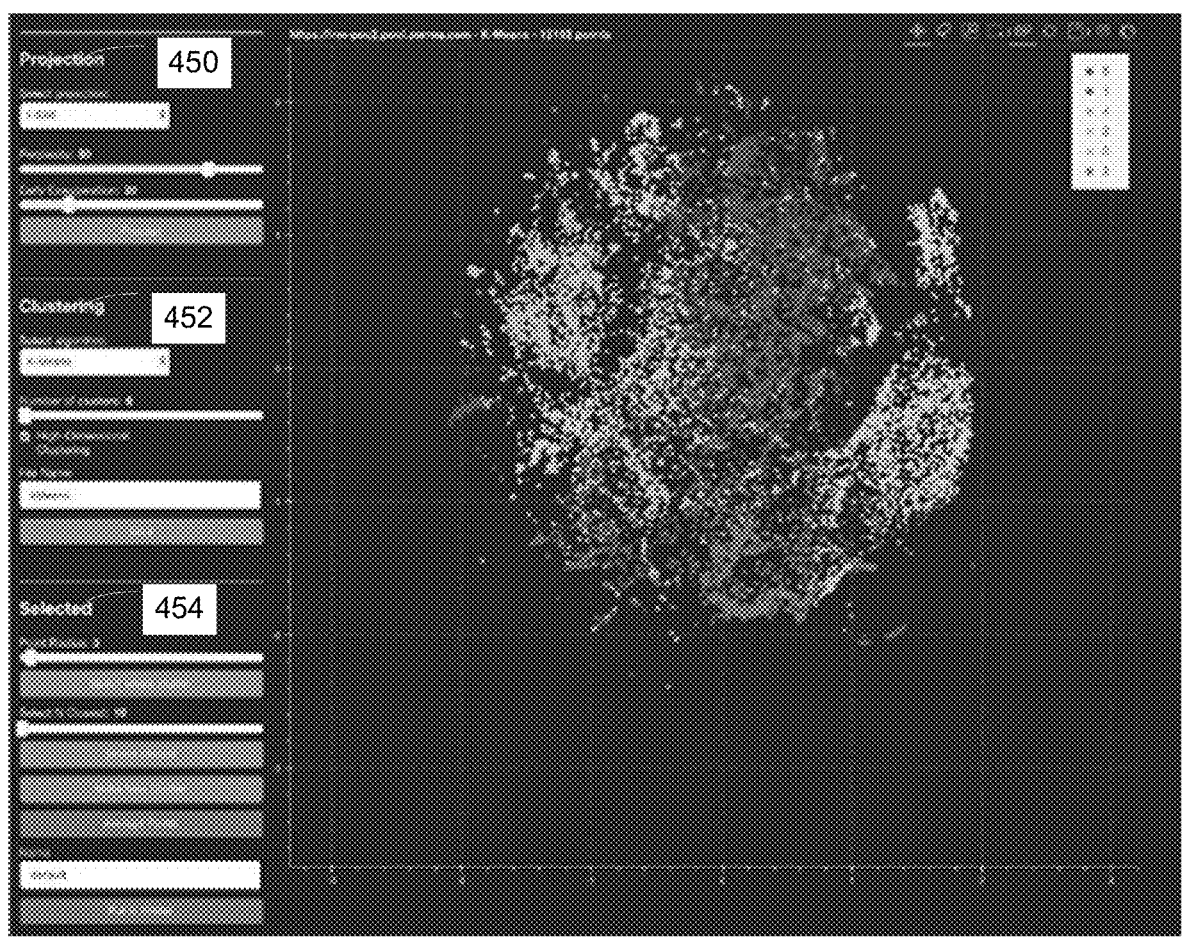
FIGS. 4I and 4J provide illustrations of interfaces for a clustering tool, according to some implementations.
Figure 4J:
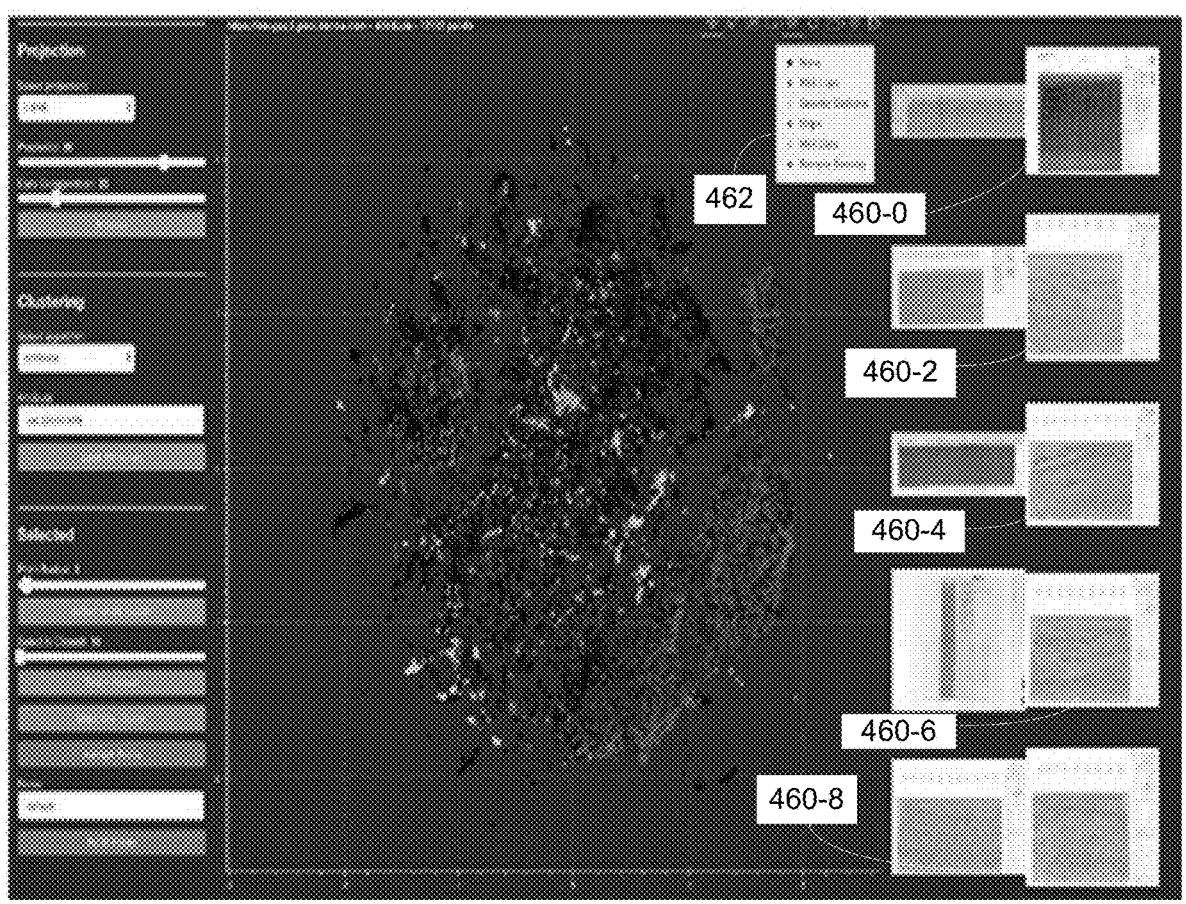

Some implementations provide a clustering tool (e.g., a visualization tool) for performing an initial exploration of assets (e.g., image files) by computing and visualizing hashes. Thus, a user can view and interact with a large database of assets in an efficient manner (e.g., using a single visualization where patterns in the data become apparent). FIGS. 4I and 4J provide illustrations of interfaces for a clustering tool, according to some implementations. In some implementations, as shown in FIG. 4I, the interface provides various affordances for a user to control or select data to project 450. In some implementations, the interface provides one or more affordances for clustering 452 (e.g., an affordance to select a clustering algorithm, an affordance to select number of clusters, and so on). Some implementations provide affordances for finer control of the clusters selected 454$by$ an automatic clustering algorithm. FIG. 4J illustrates another interface, according to some implementations. Some implementations display a variety of data attributes as part of the clusters. In FIG. 4J, the interface provides one or more controls or affordances 462 to select (or deselect) or display one or more attributes 460-0, 460-2, . . . , 460-8 (e.g., finer details or characteristics) of the clusters, according to some implementations.

Dimensions: Continuous vs Discrete

Figure 4K:
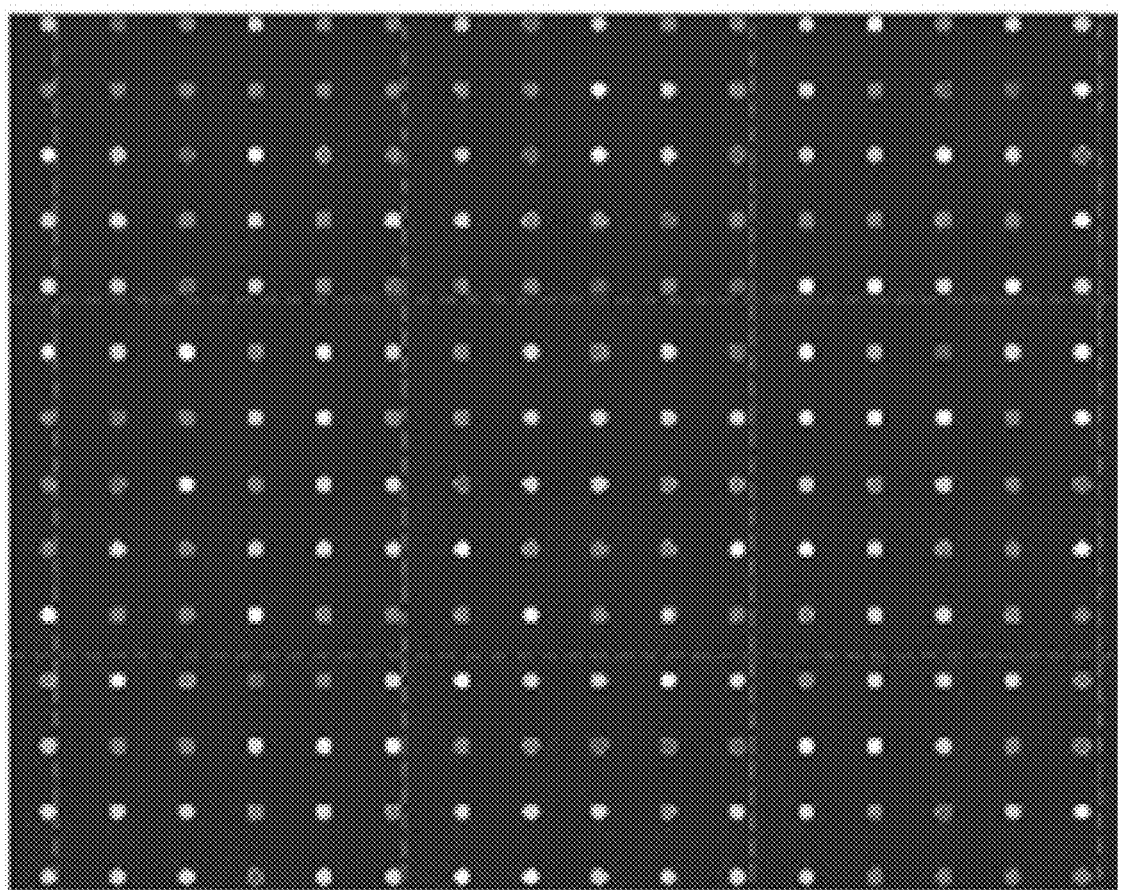
FIG. 4K illustrates quantized hashes after evaluation by a conventional clustering algorithm, according to some implementations.

Finding clusters in higher dimensions is complex due to the number of items, size of each dimension, and number of dimensions. Some implementations simplify the problem by limiting each dimension to a very small domain (e.g., 16 distinct values in the examples above using 4 bits). By using narrow, highly quantized individual dimensions, some implementations simplify computation (e.g., to move and resize a 2048-dimensional sphere or a 2048-dimensional box around to find clusters) with dimensionality reduction. FIG. 4K illustrates quantized hashes after evaluation by a conventional clustering algorithm, according to some implementations. Sometimes, quantization-induced clusters do not correspond to the content of the images. Some implementations use one or more clustering schemes described below to avoid this problem.

Dimensional Discarding

To further accelerate the clustering process, some implementations apply dimensional discarding, as opposed to dimensional reduction, which combines some number of dimensions into a smaller number of dimensions. Dimensional discarding eliminates unused dimensions as a first step to help minimize processing time. Some implementations identify dimensions that use only a small subset range of the full domain. For example, consider a 4-bit encoding. If only 2 of the 16 possible values for a given dimension are used across all hashes, then that dimension is not providing a wide breadth of information and may be discarded for all points before clustering.

In a continuous domain, some implementations discard dimensions by setting a threshold for the range used in a dimension. If the points in that domain describe an area (or a distance) less than the threshold, then that dimension doesn't have enough useful information. It can be discarded from all points before clustering.

Some implementations do not use an absolute threshold, but instead use a threshold that is relative to range extents in all domains of the vector. For example, if most domains in a given space have ranges on the order of 1000, but a small number of domains have ranges on the order of 0.1, then the small number of domains are discarded before clustering.

Some implementations obtain compressed and denoised derivatives of the similarity hashes (e.g., similar to how a zip or a similar compression algorithm computes an optimal codebook for the files it's compressing). Some implementations reduce dimensions by projecting input data onto a set of principal components. Some implementations make use of the fact that activations for individual features are not evenly distributed, and construct codebooks for the non-uniformly distributed features using a clustering algorithm (e.g., k-means clustering). In some instances, this methodology boosts the accuracy of similarity search, even without changing the search code.

Similarity Search

In some implementations, a method is provided for finding semantically or otherwise similar images in a collection. Given one or more target images, the goal is to find images in the collection that are most similar. Some implementations define similarity in a semantic sense (i.e., not as a direct comparison of pixel values, brightness, or hues, but as a comparison between actual content of the images).

Some implementations use a "similarity hash" generated using a convolutional neural network. Some implementations combine various methods for searching within the hash space. Some implementations define a similarity hash as an array of values, such that similar images produce similar values for the hash. Some implementations find similar images by searching for closest neighbors in the multi-dimensional space defined by the hash.

CNN Layers

Convolutional Neural Networks (CNNs) are a type of artificial neural network in which the connectivity pattern between neurons is inspired by the human visual cortex. CNNs have been shown to produce state of the art results in image classification, object detection, and other problems related to computer vision. Typical CNNs used in computer vision applications are deep networks, with several convolutional layers stringed together with other layers that lower the resolution of the data (e.g., pooling) and fully connected layers where all of the outputs of the previous layer are connected to all of the inputs of the current one. Specifically, CNNs used in classification (such as AlexNet, or Google's InceptionV3) end with two or more fully connected layers. The very last layer typically has as many outputs as the number of categories the CNN was trained to classify. The CNN is trained so that the values of these outputs are floating point numbers between 0 and 1, depending on the probability of the image being a representation of each corresponding label. The output of the layer preceding the output layer is sometimes called a "feature vector," because it is an n-dimensional vector that contains a description of the features found in the input image, so that a final fully connected neural layer can classify the input image into categories. In some implementations, the feature vectors are supplemented with features computed using alternative techniques, such as an alternative CNN.

Semantic Similarity Hashes

Figure 5:
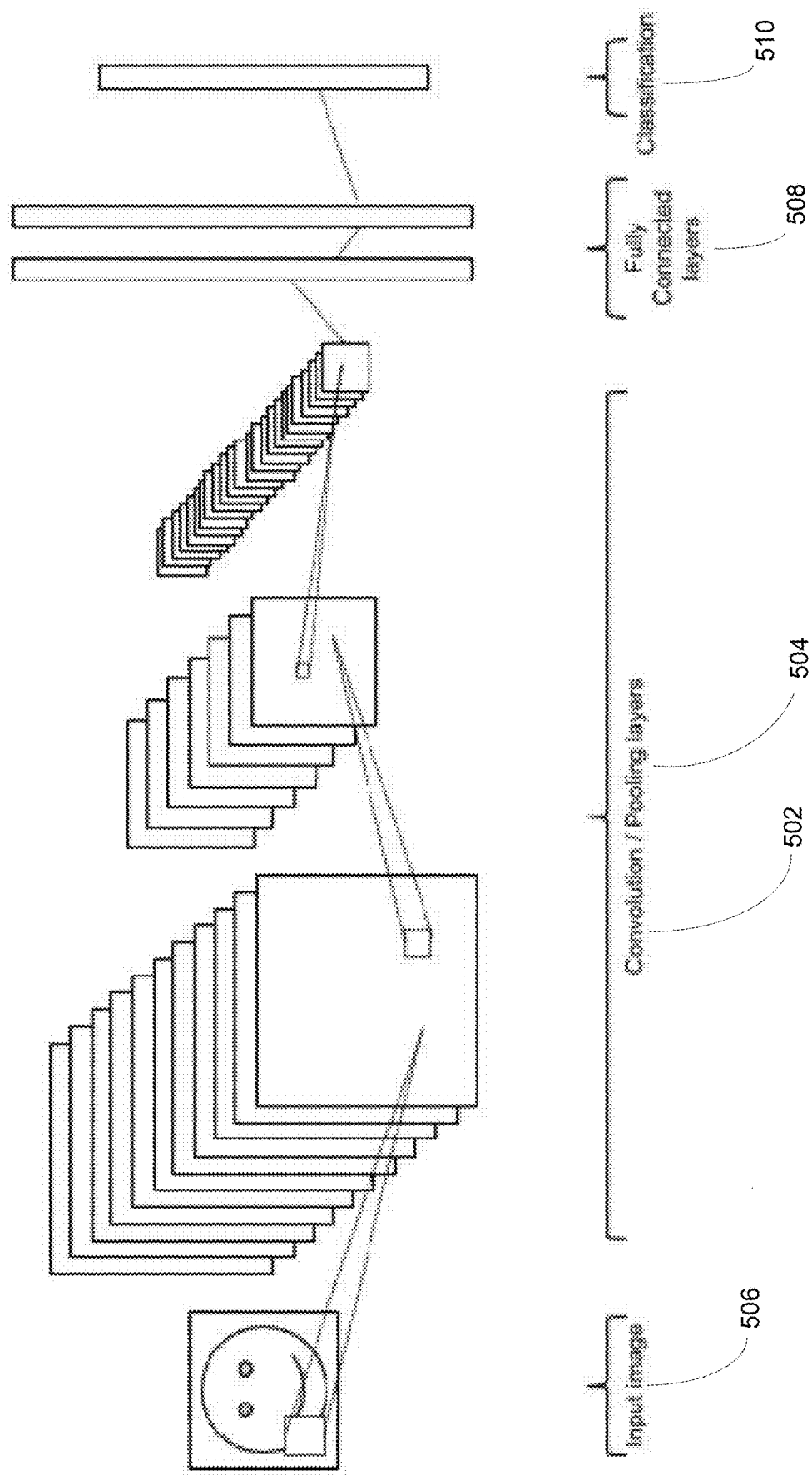
FIG. 5 illustrates an architecture of a Convolutional Neural Network (CNN)-based classifier, according to some implementations.

CNNs are used in a variety of applications, including image classification, and object detection. An example architecture of a CNN is shown in FIG. 5, according to some implementations. For a CNN that is used as a classifier of input images 506, there are typically several convolutional layers 502 that perform convolutions. The convolutional layers are intermixed with pooling layers 504, which lower the resolution of inputs. The last few layers are typically one or more fully connected layers 508. Typically, the last layer 510 has as many outputs as labels that the CNN is designed to classify. The output of the fully connected layer 508 preceding the last layer is sometimes called a feature vector. In some implementations, this vector has 2048 dimensions, and is a representation of features that exist in the image. Similar images produce feature vectors of similar values (e.g., feature vectors at small distances from each other).

In some implementations, to facilitate a quick comparison between feature vectors, each vector is encoded as an n-character hash (sometimes called a "similarity hash"), where n is the number of dimensions. Some implementations represent each vector component as a character in a string, and other implementations represent each value as a one-byte or two-byte integer in an array.

To quantify the vector as a string, some implementations scale the value of each component of the feature vector by a given amount (e.g., scaling to a numeric range of 0.0 to 16.0), and then select the integer part of the scaled value. In this way, some implementations encode the vector as a hash, or string of characters. Some implementations quantize the vector values to 16 possible values (for e.g., using only 4 bits to encode each position) without significantly affecting the quality of the search results.

An example value of a 2048 character Resnet-152 hash computed for an image of a tractor is shown below:

```
0050FJPKPPBPJEPBEPPLLAPPHKEBNPOPOKGPLBPDPPIPPPEPCPPIIPBHPEPPPPAPPLPJPPJNPPPCPC
FPKOENPAPPFIPNPPPPEPFIKAPBPAPAEPEIPPLEBHFPANIPPFAIFMMEAMPDPPDPAPPIPPGBPKMPPNP
PIEFABECAPDNGNIHKPGPAHPDPEPKPPPPPPPPPGPPCIMLCHBPGAAJPKPPLFDEIOPPPPFPDPGDPPFP
PFPKDIIPBHCAHPCPPFPCPPPPDAMNPAHPPPPFPPEELPPAPCPPPEPPBPPIIPKLPPPPFPALFIGPAHAAG
OPPPKGAJCHJPHCJDMPEEAOPPMPHDEFGPPJPMPPEPEBLGAEPPPPPDPPDBPEAPEDGPFPKPPCFKA
PPDEPDGNPDBOMPKPPIPNPDPPLCFFDGPAPPPAMPIPOONGOPPECDCBPPPPIPPEMPPLAKBJOHPJLP
DPBEPCPPPPDBPGPHGPKPAPPDCNJJPNPPMFFDPPDOPKPPPPPPPJEPPCDKFICDIFJPCPPAGAPLAFP
PNPFPIPHBKDJHPGKCIAPNPGDPFLLPIHGPKGUIEMPBPDGHJPHFPPKLPG0PCOFDOPPCKPPGPJCBFG
PEPPPEPAJPPCPBCCKKBPEGKJPPPFPOPDEJPPPPPBPPFHPPIPMOOPPCPPPNPLBPAPPIPPHIDLIPAPP
PGPPPGGGIPPKPPFKAEPPMLBPNEKICLPPBEHPPPPCNPIPMPIPEPLILPAEPPPLEGFKKCPFHPPFHBKPL
FPPMDPHPDKHPNAPJIFEPPBOPPPEPGACHFPBPPPAIPPKOGPNOJPMPPBBPKPGNPPMPPPPGGELPPP
PGCPEPJCPPPEPFOLPMBPNLPPPJPGCHEPJPNCPBNPPKJNPPMEPDPFMDKPFCCPPHCPPIPPPMPBPO
PPCEPEPIPLPPPIPJOPLPPONPDPJLLJJP
PPEJPPHEGPHPDPPLICKAPGLHDPCLCBBBPIKCKPIAIICPIBGLAJCPJPOKEOGPLPKEKPPPBGBIELPAMP
NKLOCPGLJFJPPDCPPMDHJPLEOPPEPPPPPOPDPAPJLPNAMIOPJPPPJPHPJPPPDBPCEEPBPIGPPPPE
PMFPDPFPPDPPEJJKMAPCNEJBCPNEPPEPAPNOPAPJPPJUPPJPPPPGLLPPOFPPPPHPPPEPCJPBPPP
PGCLIAPNGPKDEHPMFNPAPDGKPFPPPPMPMJBKPMDPAKPHPJPPMGKMPAMPPPEGPFJHPFJACMPEP
PPPPPPMHPPPFKDLGAKJNPPLPPFLLPBHNPJJDBPEKPCIPBFDIPJAFIPFEOPJEPICOBPCPKGJDCPPFNP
```

```
PPCAPGPMPPPDEPPAPNDFPPHHPPPIPDBLPBEPMIHPDPHJPPIPKEHPFDGPAPEOAJPPDIPPOLGPPPDE
BPCPOGPFOIFFPPPPIEAPPEPDPPOPGGPPONCDBABPCKPPPPPPPCOAGAPPPPNFKCPAEGPPMLCHPP
PFIPPPJCFBPBPLHPPFPPDPPPCHLOPKBJECPEHPBFMPDBMBPOPDPPOPGKEPAPFBDPAPPIGPPDPPI
EIEPDGPPPPPPOPKIHPPNPHLFAPPCPPLPGIKHFHKPPDDAHPPPBLEPPAFDPLPJPDIELPPNEPPPPPCPK
PIGJNIPIGPNFPPEPPIPOPPBIEPPPBCFFPGJDFHINBBPMLAAPGPBGHCCPPHPEHPEPLOBPPEPHFIPNP
HGPCPPPPBJPEPPKGDPCPPCPPPPPEPOPHMGOBGAPAPPNNPPAPGKEMOANPPMPOMAPPDFMLPNC
PPPBPPGDKKGFBCLPPPPMGGPPFPOGPPPFPPPKJMPBPILCPJJMPBIAPAPHHPLPPKPPFCHFPJPPGGA
FPGKPDPPPMPPPPMPPNBHAICPFBFNPPPPFPPPPKCEPPAAIDOPPHPCIPBPPPDPLLPALFPHPNPIACPIP
PPCPNKAPCPLCDIOPPJPPACALONPEPAPDPPAPPPPPAMBPPEPCPPLKEPLAPJPPPPCOPDPPLJPAPPP
PLPPPNPMPAPLPPPGPBDJPHPDCPPNPIHPIKJGPAFOBMPNPPLPDCPPFPP
```

In the example shown, the hash includes a 5-character header that is used to indicate different hash versions. To compute this similarity hash, some implementations use a pre-trained neural network (e.g., a Google trained CNN called Inception V3 or a Microsoft Research trained CNN called Resnet-152). Some implementations associate the similarity hash with an asset (e.g., an image file) as an attribute.

Some implementations use other kinds of similarity (e.g., face, color, words) that differ in the type of similarity hash used. The following sections describe the other types of hashes.

Color Hashes

To build a hash based on color, some implementations calculate a color histogram of each image. Some implementations use a specific color space for a color histogram (e.g., HSV or LAB). Some implementations quantize each bucket of the histogram and encode the whole histogram as a string. Some implementations use this color hash in a search for images similar to an input image, and search results contain images that have similar colors to the input image.

Face Hashes

In some implementations, face recognition is performed by quantifying facial features and comparing these features to find face matches. Some implementations perform similarity search (for a given input face) by generating a hash based on these facial features, and return results of faces that look similar to the input face.

Vocabulary Based Hashes

Some implementations build a hash that uses word or n-gram frequency, and use this hash to compare word-based documents. Some implementations use a "bag of words" methodology to select a vocabulary, or a fixed set of words, and, for each document, count the number of instances of each word in the vocabulary. In some implementations, a resulting numerical array is quantized and encoded into a string in a way similar to the other hashes. In some implementations, when a search is performed using this hash, the results will show documents that use a vocabulary that is similar to the input document. Some implementations use this methodology to find different forms of a document (e.g., of a particular type) in a collection of scanned and documents processed by an OCR process.

Other Hashes or Types of Feature Vectors

The foregoing examples are meant for illustrative purposes, and other forms of hashes are possible. In general, the techniques described herein can be applied in any scenario where it is possible to generate a fingerprint (e.g., a similarity hash) that varies by a small amount when two documents or images are similar. For example, some implementations use audio-based hashes, and specific hashes that use ad-hoc features as similarity hashes. Some implementations build a feature vector with features like the number of horizontal lines detected, number of vertical lines, number of certain shapes like boxes and circles, and the number of words detected with a vision algorithm. Some implementations subsequently use this type of hash to find types of forms, graphs, and similar imagery. In addition, the hashes described can be combined to form hybrid hashes, such as supplementing a CNN generated feature vector with color and/or face hashes.

Searching Image Hashes

In order to search in the space of image hashes, some implementations use the notion of distance between two hashes. Some implementations define the distance as the n-dimensional Manhattan distance between two hash values. The Manhattan distance is the sum of the absolute differences between all the values in one hash and the corresponding values in the other hash. Some implementations search for a similar image by computing a hash value for a given image and by finding other hashes such that the distance between the computed hash and the other hashes is as small as possible (e.g., within a user-provided threshold value). Some implementations use Euclidean distance, or similar other definitions of distance. A Manhattan distance is useful when the values in the hash are independent from each other and not correlated.

In some implementations, given a collection of images, a similarity hash is precomputed (e.g., before processing an image search) for each image in the collection of images. Some implementations select an image in the collection, retrieve the similarity hash for that image, and either search for all other hashes that are closer to the similarity hash (e.g., by a distance less than a predetermined or user-provided threshold), or sort the images in the collection according to their respective hashes' distance to the original hash.

Some implementations use a plugin for ElasticSearch. The plugin compares the selected hash or hashes against every other hash in the database, and assigns a score based on the distances. ElasticSearch is then used to sort the search results based on this score. Some implementations apply a desired threshold to limit the number of results. With ElasticSearch, a similarity hash is easily applied in the enterprise space. For instance, a single ElasticSearch node with 8 CPUs can search millions of similarity hashes in near real time. At larger scales, Elasticsearch can be used to spawn or distribute billions of image hashes out across potentially thousands of nodes. Example source code for an ElasticSearch plugin is included in FIGS. 10A-10D.

Some implementations perform a search against multiple hash values, looking for hashes that minimize the sum of the distances to each of the selected hashes. Some implementations allow a user to fine-tune or guide the results of a search, via the use of multiple hashes. Some implementations compute the average value of two or more hashes, and perform a search with the resulting hash value.

Examples of Semantic Similarity Search

Figure 6A:
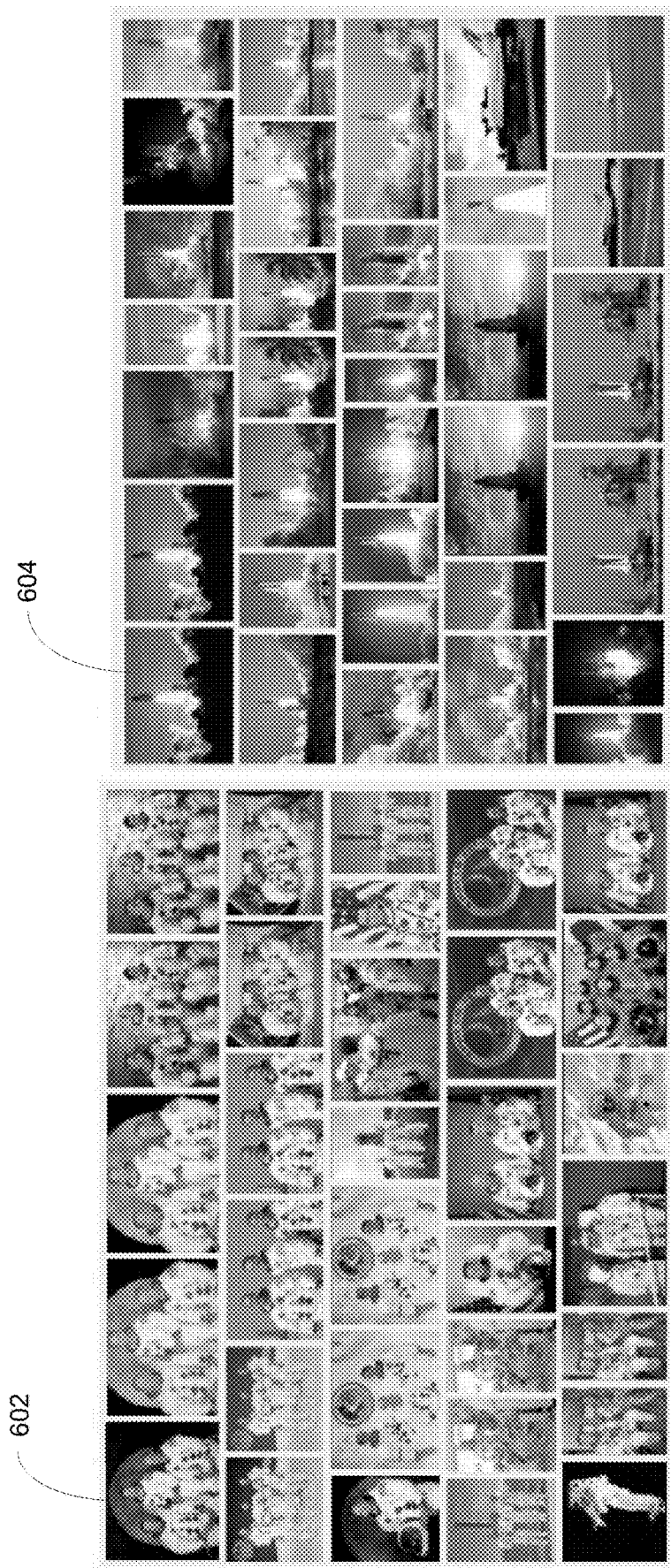
FIGS. 6A and 6B are example applications of semantic similarity search, according to some implementations.
Figure 6B:
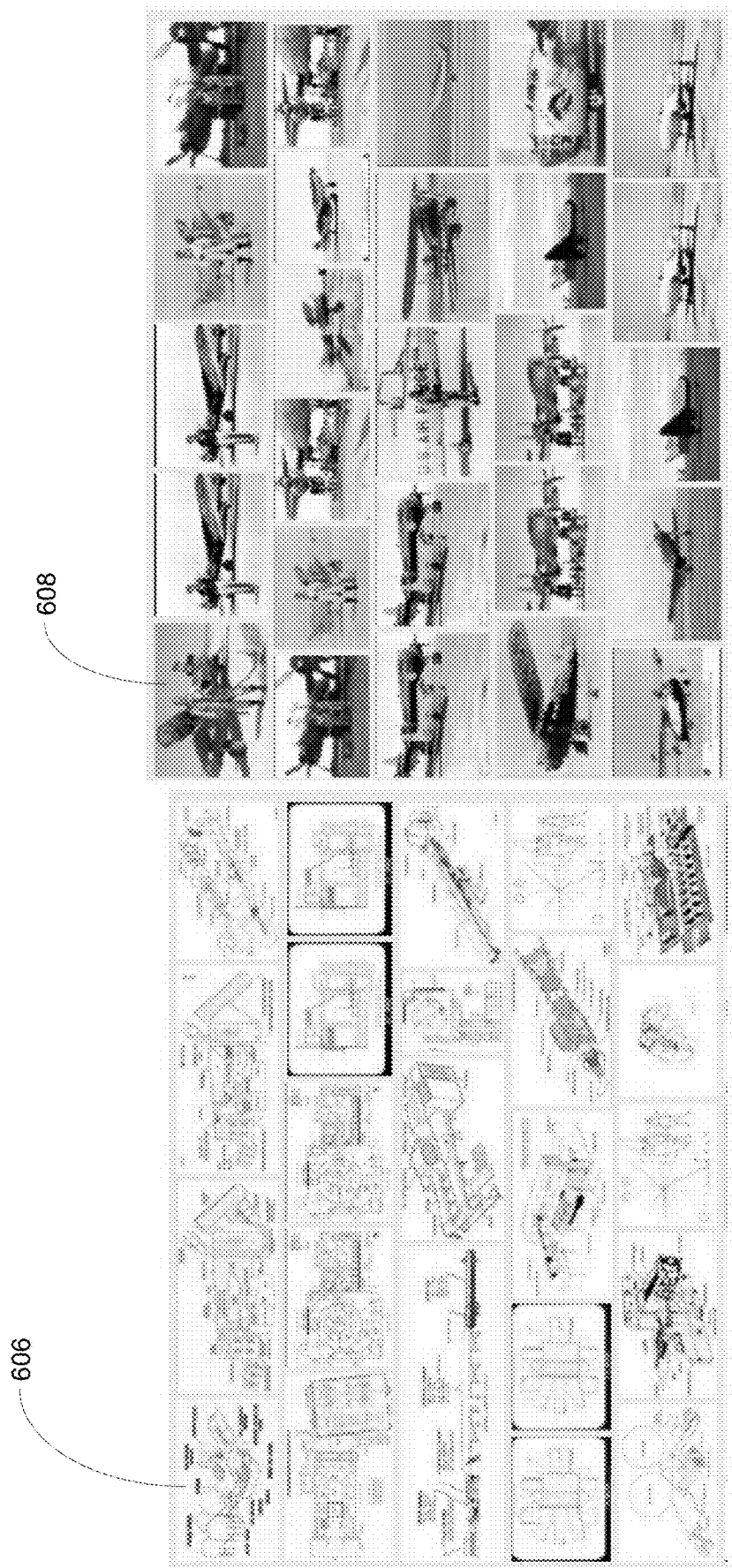

FIGS. 6A and 6B are example applications of semantic similarity search, according to some implementations. In each case, a user selects an image (or an initial image is automatically selected from a collection of images) in the top left corner (e.g., the images 602, 604, 606, and 608). The rest of the images shown in each figure are the most similar images corresponding to the selected image. Some implementations use a repository of about 5000 images (e.g., images from NASA). Some implementations use similarity search not only for photographic images, but also for graphic line-based diagrams (e.g., the images shown in FIG. 6B).

Figure 6C:
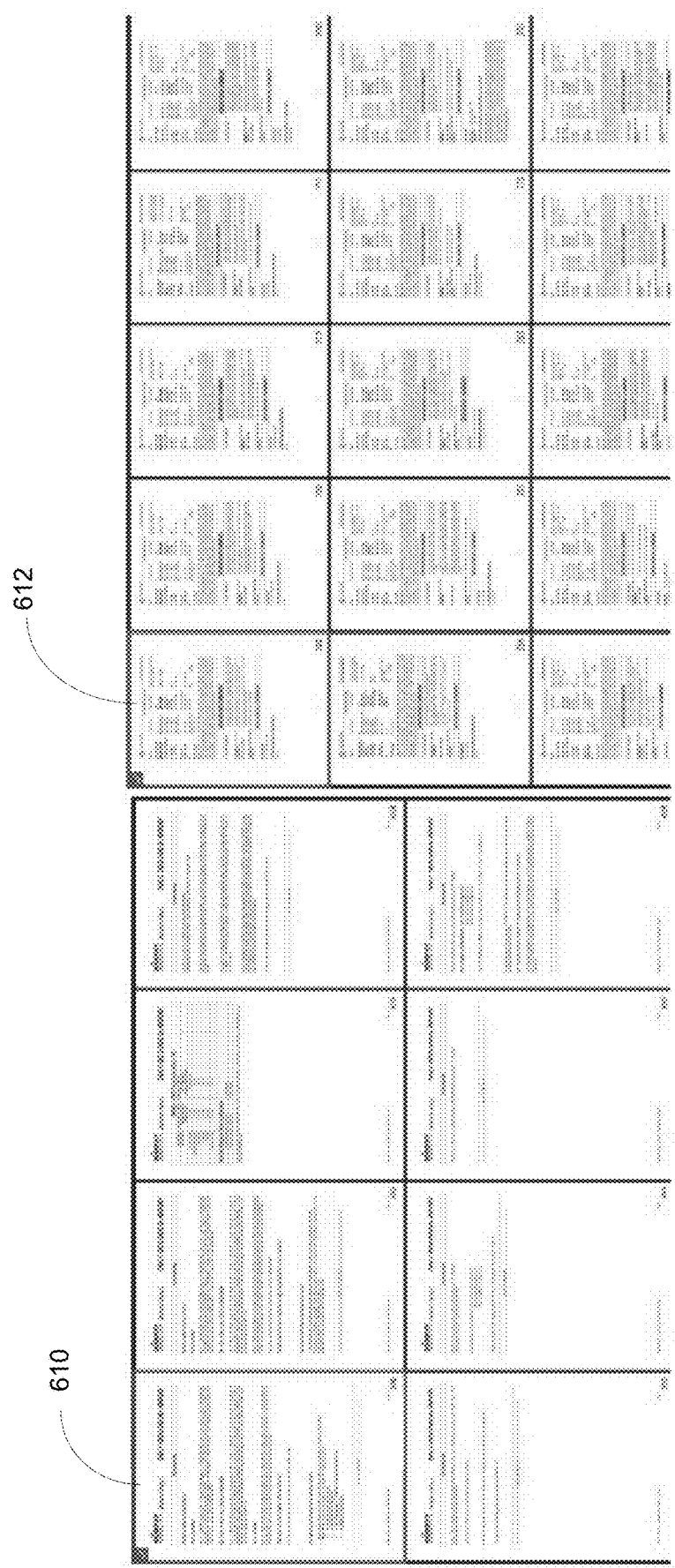
FIG. 6C shows examples of similarity searches, according to some implementations.

FIG. 6C shows examples of similarity searches using a "Bag-of-Words"-based hash of scanned documents using a user-selected documents (e.g., images or documents 610 and 612), according to some implementations. A purely image-based similarity search is unlikely to return results like the documents shown.

Figure 6D:
FIG. 6D shows the results of a face similarity search, according to some implementations.

FIG. 6D shows the results of a face similarity search, according to some implementations. Here, the user has selected one clip (e.g., the images 614 and 616 in the top-left corners), and the search shows other video or image clips with similar faces as that in the original or user-selected clip.

Feature Vectors and Combination of Hashes

A method is provided for finding similar images in a collection of images, according to some implementations. The method uses semantic, facial, color, keywords, and generalized metadata metrics, according to some implementations. Given one or more target images, the method finds those images in the collection that are the most similar in a semantic sense (e.g., not by comparing pixel values, brightness, or hues, but by comparing the actual content of the images).

Some implementations use a "feature vector" generated by a combination of convolutional neural network hashes, semantic hashes, facial recognition hashes, and other types of hashes discussed below. In addition, some implementations employ an algorithm for searching within the feature vector space so that the algorithm can easily operate on large repositories and scale in performance. In some implementations, a feature vector is an array of values. Images with similar contents produce similar values for the vector. By searching for closest neighbors in the multi-dimensional space defined by the feature vector, some implementations find similar images.

Some implementations quantize a feature vector using an integer encoding and limit the overall length of each vector, thereby improving performance and memory requirements. The resulting quantized feature vector is sometimes referred to as a "hash" herein.

Some implementations combine multiple hashing techniques to obtain a combined hash, thereby leveraging each of the individual techniques. Some implementations encode the combined hash so as to make subsequent use of that hash (e.g., for searching, comparison, and/or clustering) computationally less expensive. Some implementations weight contributing hashes (e.g., introducing bias) when obtaining the combined hash. Some implementations apply the techniques described herein to video, audio, and office documents. Examples of various hashing techniques are described above.

Combined Feature Vectors or Hashes

Some implementations combine hashes to generate a global metric that provides a higher quality or tuned result. Some implementations normalize and subsequently combine hashes using a combination technique, such as linear combination. Some implementations quantize hashes and normalize hash length to avoid bias. Some implementations optionally add bias (e.g., after normalization) by scaling certain areas of the hash. This allows certain areas of the hash to be tuned to be more important when comparing hashes against each other. Thus, the combined hash provides an intuitive similarity that includes a wide range of attributes and algorithms, and combining algorithms average the results to reduce the number of outliers.

FIGS. 7A-7F provide a flowchart of a method 700 of searching (702) for similar images in an image repository, according to some implementations. The method 700 is performed (704) at a computer (e.g., the server 110, the client devices 104, or a combination thereof) having one or more processors, and memory. In some implementations, the computer also has a display to display results of a computation. The memory stores (706) one or more programs configured for execution by the one or more processors.

The method 700 includes receiving (708) an input image having content. For example, the client device 104-1 receives an input image 108-1 via an image or document search application 106, according to some implementations. In some implementations, the content includes (710) one or more of: semantic content, color histogram content, facial features, words, audio content, and graphical content.

Figure 7A:
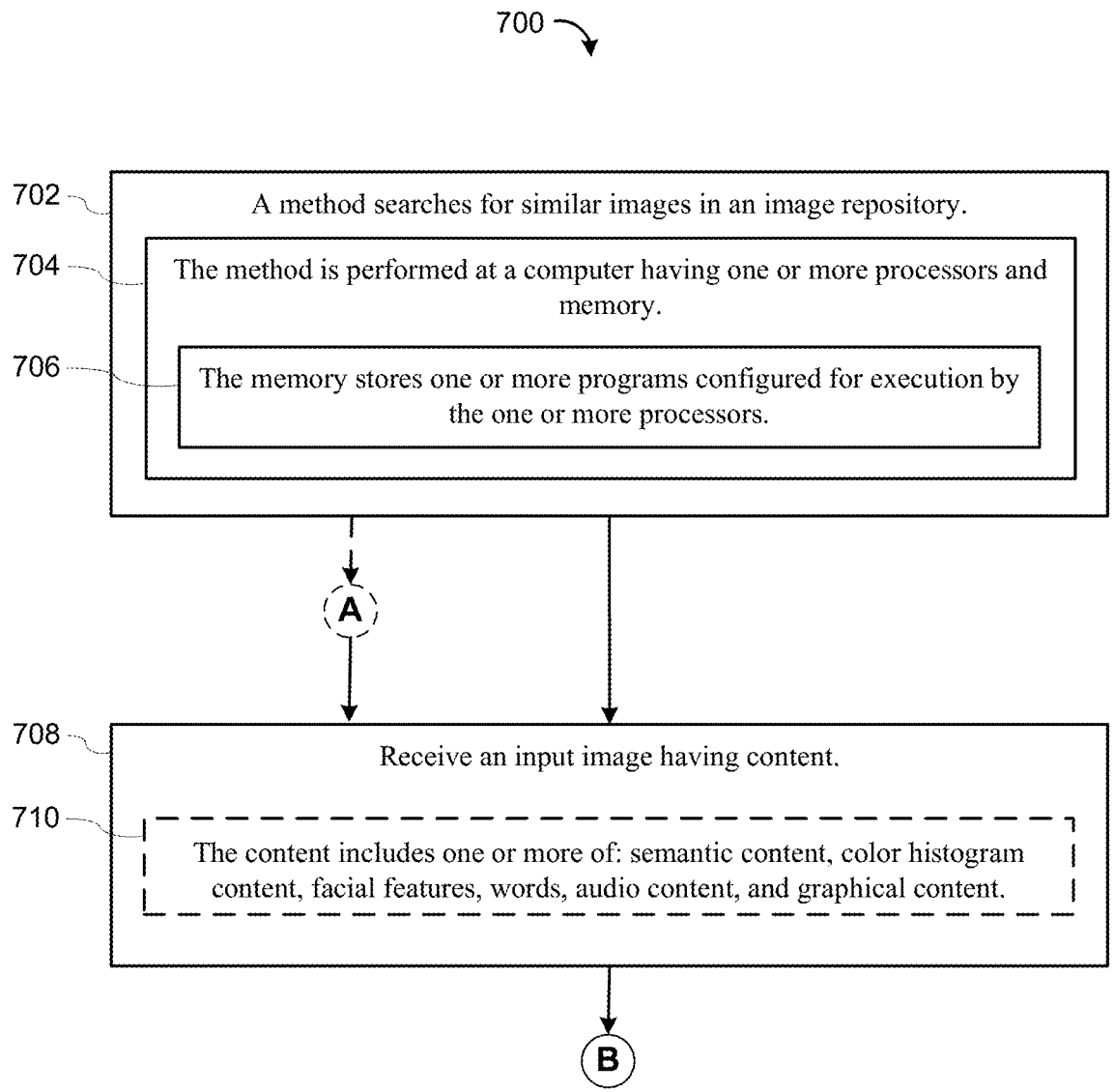
FIGS. 7A-7F provide a flowchart of a method of searching for similar images in an image repository, according to some implementations.
Figure 7B:
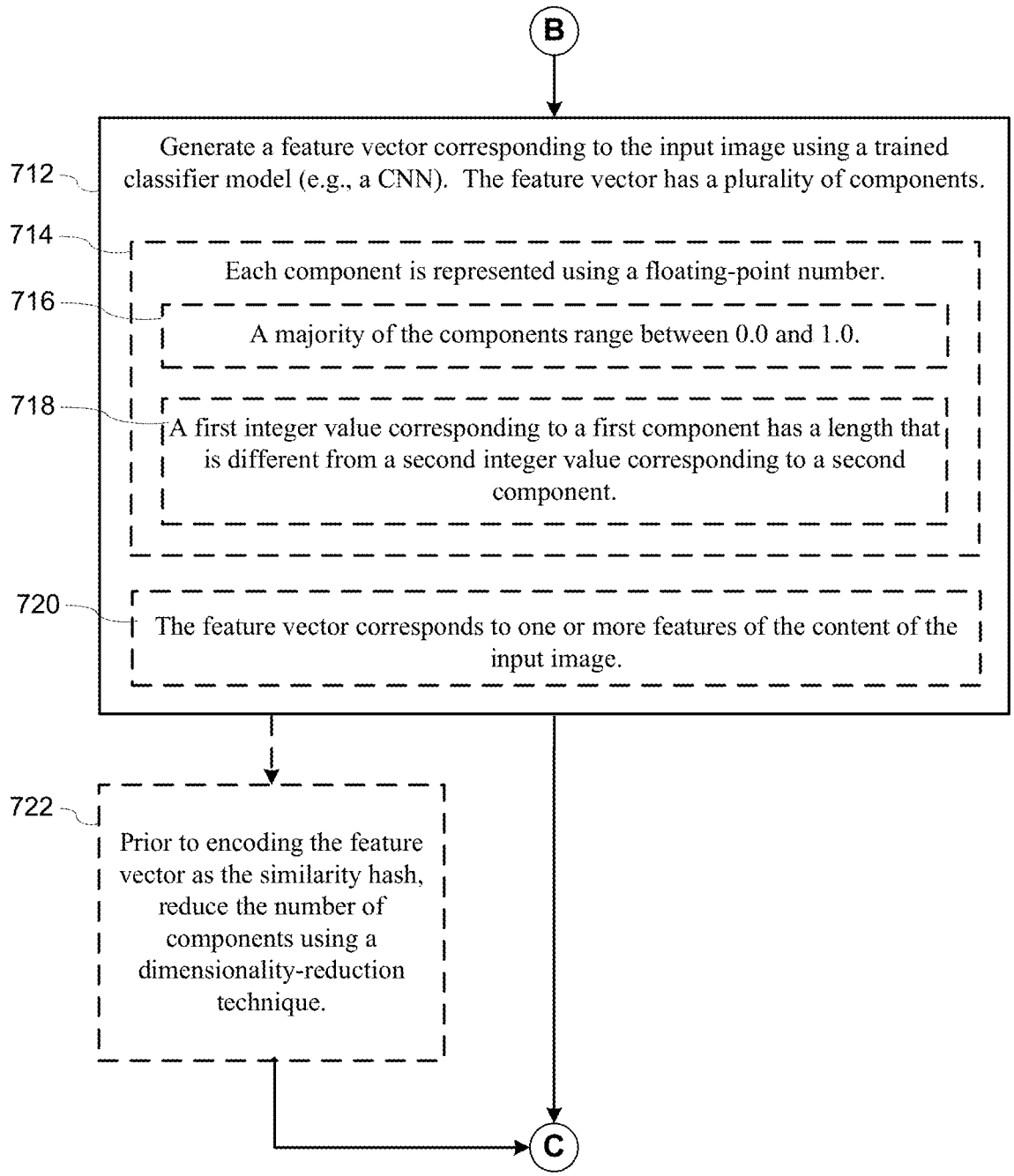

Referring next to FIG. 7B, the method 700 also includes generating (712) a feature vector corresponding to the input image using a trained classifier model (e.g., a trained CNN, such as the classifier described above in reference to FIG. 5). The feature vector has a plurality of components. In some implementations, each component is (714) represented using a floating-point number. In some implementations, a majority of the components range (716) between 0.0 and 1.0. In some implementations, a first integer value corresponding to a first component of the plurality of components has (718) a length that is distinct from a second integer value corresponding to a second component of the plurality of components. In some implementations, the feature vector corresponds (720) to one or more features of the content of the input image (e.g., the input image 506 in FIG. 5). Some implementations reduce (722) the number of components in the plurality of components using a dimensionality-reduction technique (e.g., using the techniques of Dimensional Discarding).

Figure 7C:
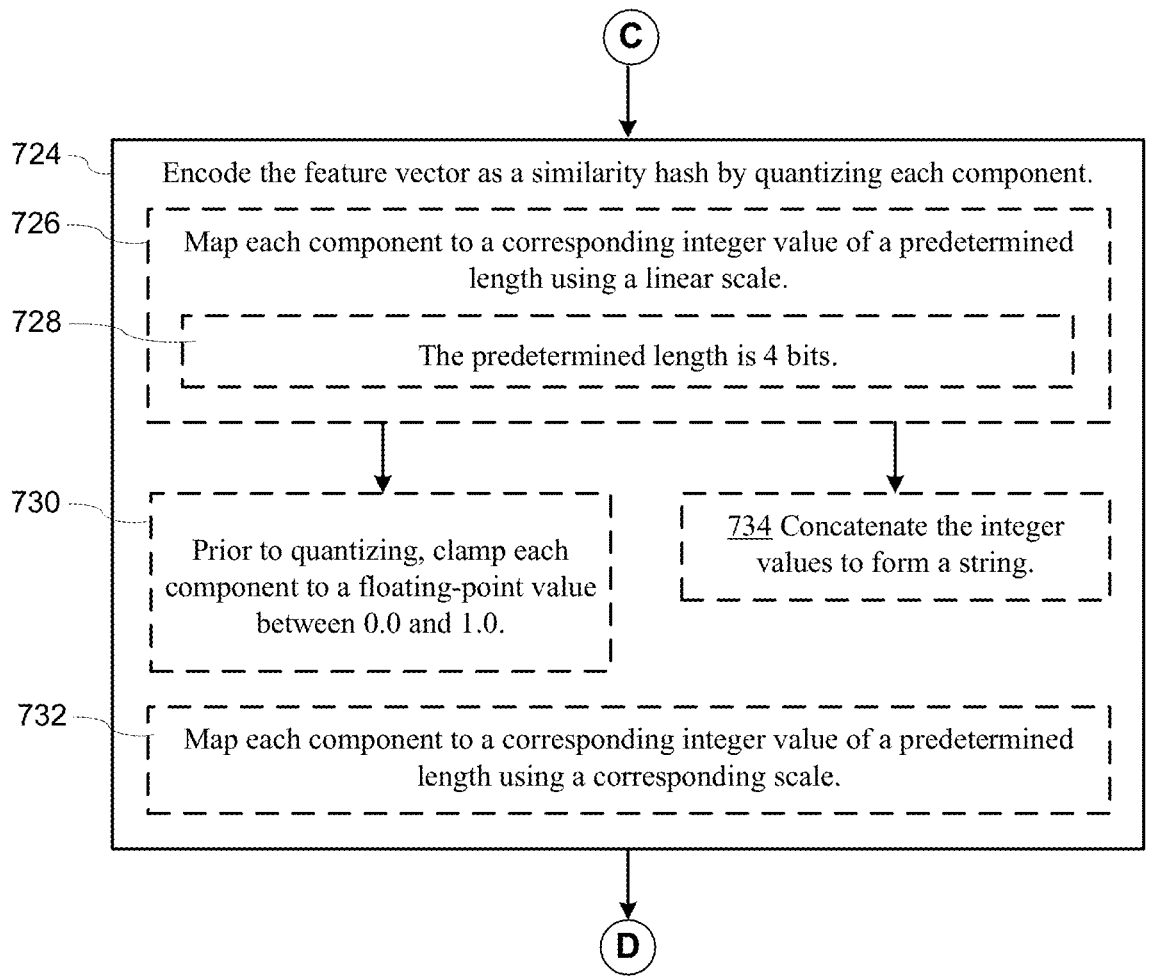

Referring next to FIG. 7C, the method 700 also includes encoding (724) the feature vector as a similarity hash (e.g., the hash patterns 112 generated by the hashing engine 328) by quantizing each component. Examples of hash generation are described above in the section on Semantic Similarity Hashes. Some implementations map (726) each component to a corresponding integer value of a predetermined length using a linear scale. In some implementations, the predetermined length is (728) 4 bits. In some implementations, the method 700 includes, prior to quantizing, clamping (730) each component to a floating-point value between 0.0 and 1.0. For example, a value below 0.0 is normalized to a floating-point value of 0.0, and a value above 1.0 is normalized to a floating-point value of 1.0. In some implementations, the range for clamping is dynamically determined, or determined based on profiling one or more applications. Some implementations concatenate (734) the integer values to form a string. Some implementations map (732) each component to a corresponding integer value of a predetermined length using a corresponding scale (instead of a linear scale or map).

Figure 7D:
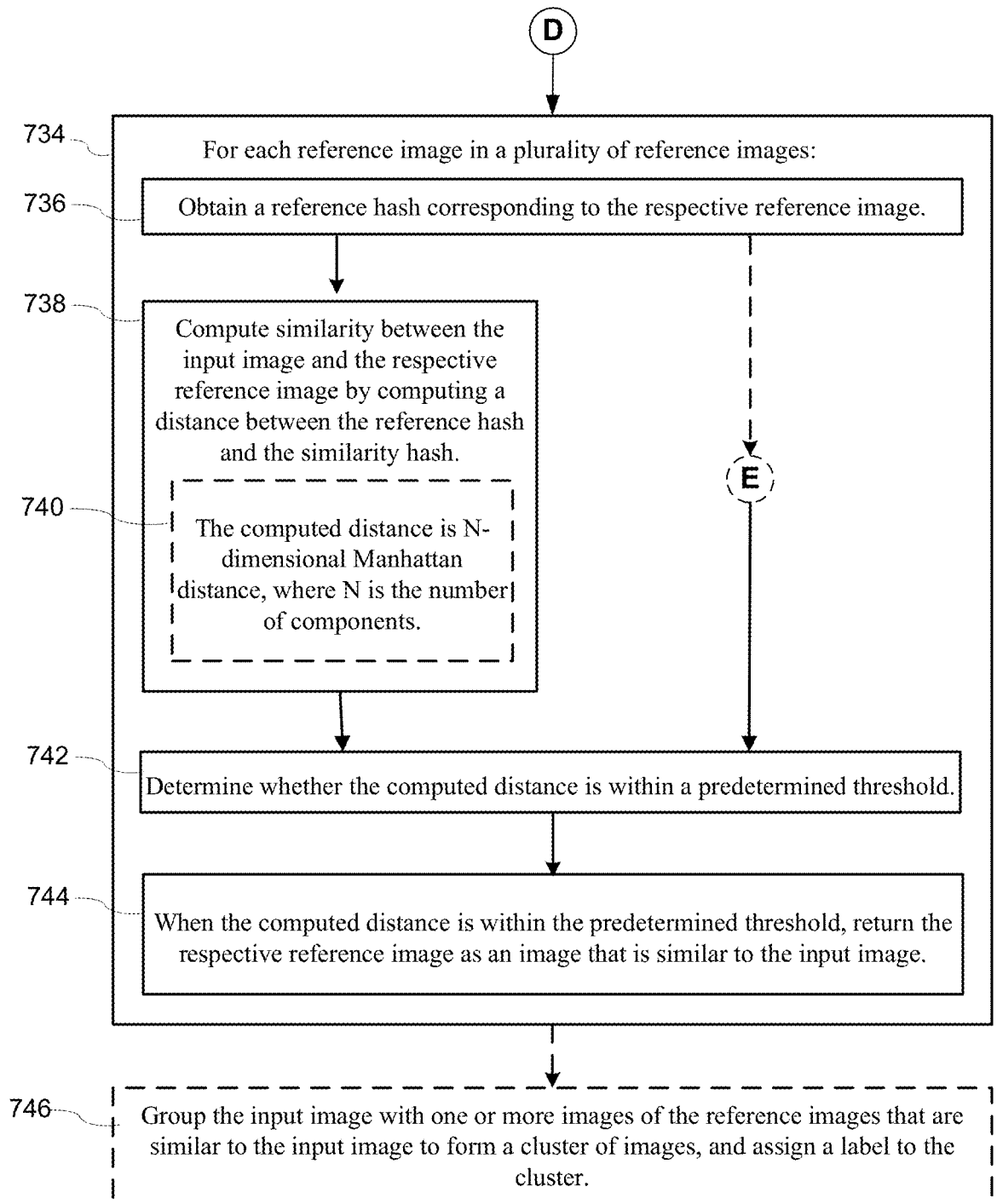

Referring next to FIG. 7D, the method 700 also includes performing (734) a sequence of steps for each reference image in a plurality of reference images (e.g., the images in the image library 120). The sequence of steps includes obtaining (736) a reference hash (e.g., from the hash patterns 112) corresponding to the respective reference image. The sequence of steps also includes computing (738) similarity between the input image and the respective reference image by computing a distance between the reference hash and the similarity hash. In some implementations, the computed distance is (740) N-dimensional Manhattan distance, where N is the number of components. The sequence of steps also includes determining (742) if the computed distance is within a predetermined threshold. When the computed distance is within the predetermined threshold, the method returns (744) the respective reference image as an image that is similar to the input image.

In some implementations, the method 700 further includes grouping (746) the input image with one or more images of the plurality of reference images that are similar to the input image to form a cluster of images, as illustrated in FIGS. 6A-6D. Some implementations also assign a label to the cluster. Examples of clustering in hash space are described above in the section on Clustering in Hash Space.

Figure 7E:
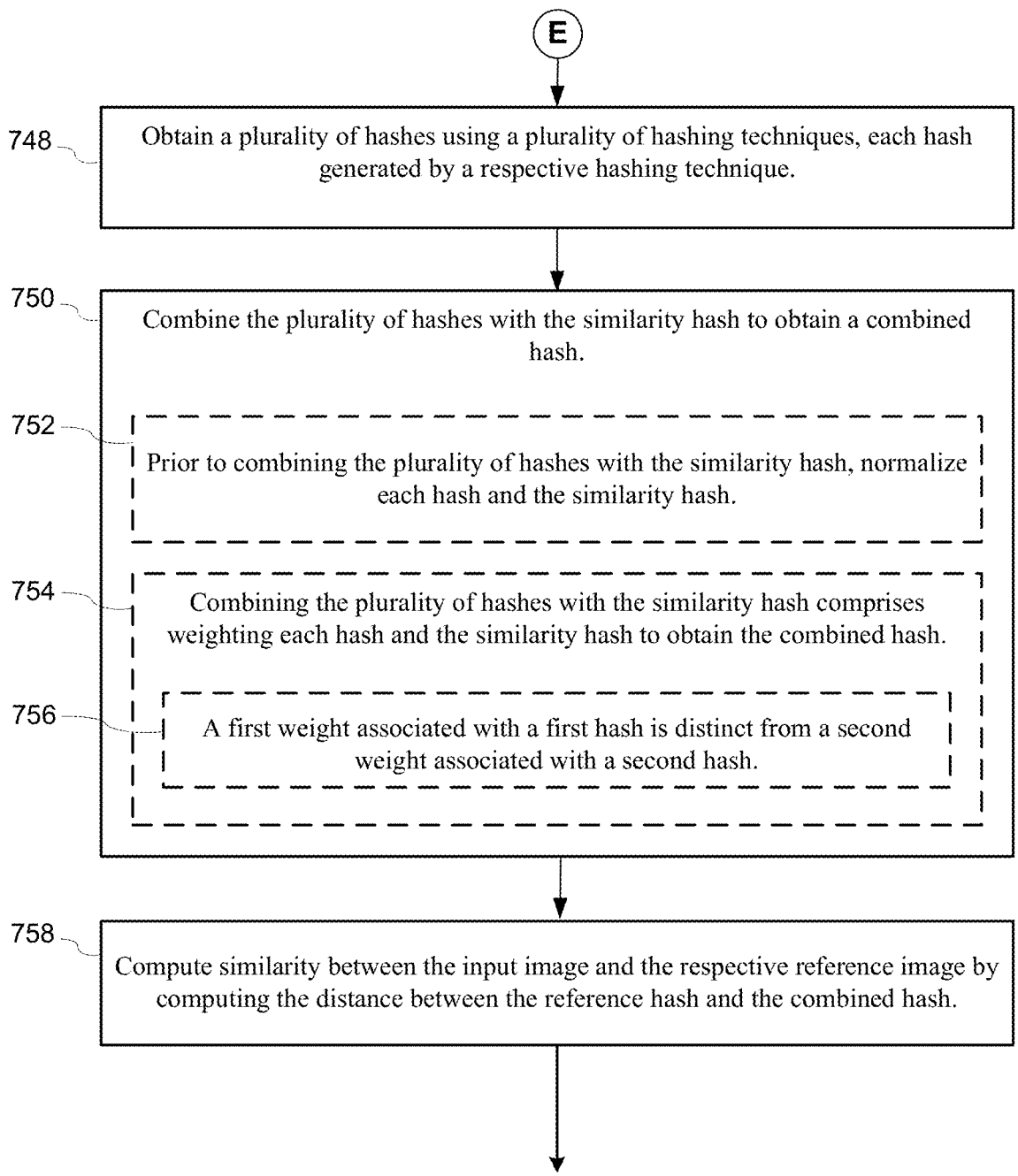

Referring next to FIG. 7E, the sequence of steps 734 (FIG. 7D) includes obtaining (748) a plurality of hashes using a plurality of hashing techniques. Each hash is generated (748) by a respective hashing technique, according to some implementations. The sequence of steps also includes combining (750) the plurality of hashes with the similarity hash to obtain a combined hash. In some implementations, prior to combining the plurality of hashes with the similarity hash, the sequence of steps includes normalizing (752) each hash and the similarity hash. In some implementations, combining (750) the plurality of hashes with the similarity hash comprises weighting (754) each hash of the plurality of hashes and the similarity hash to obtain the combined hash. In some implementations, a first weight associated with a first hash is (756) distinct from a second weight associated with a second hash. The sequence of steps 734 also includes computing (758) similarity between the input image and the respective reference image by computing the distance between the reference hash and the combined hash. Examples of hash generation and combination are described above in the sections on Semantic Similarity Hashes, Feature Vectors and Combinations of Hashes, and Combined Feature Vectors or Hashes.

Figure 7F:
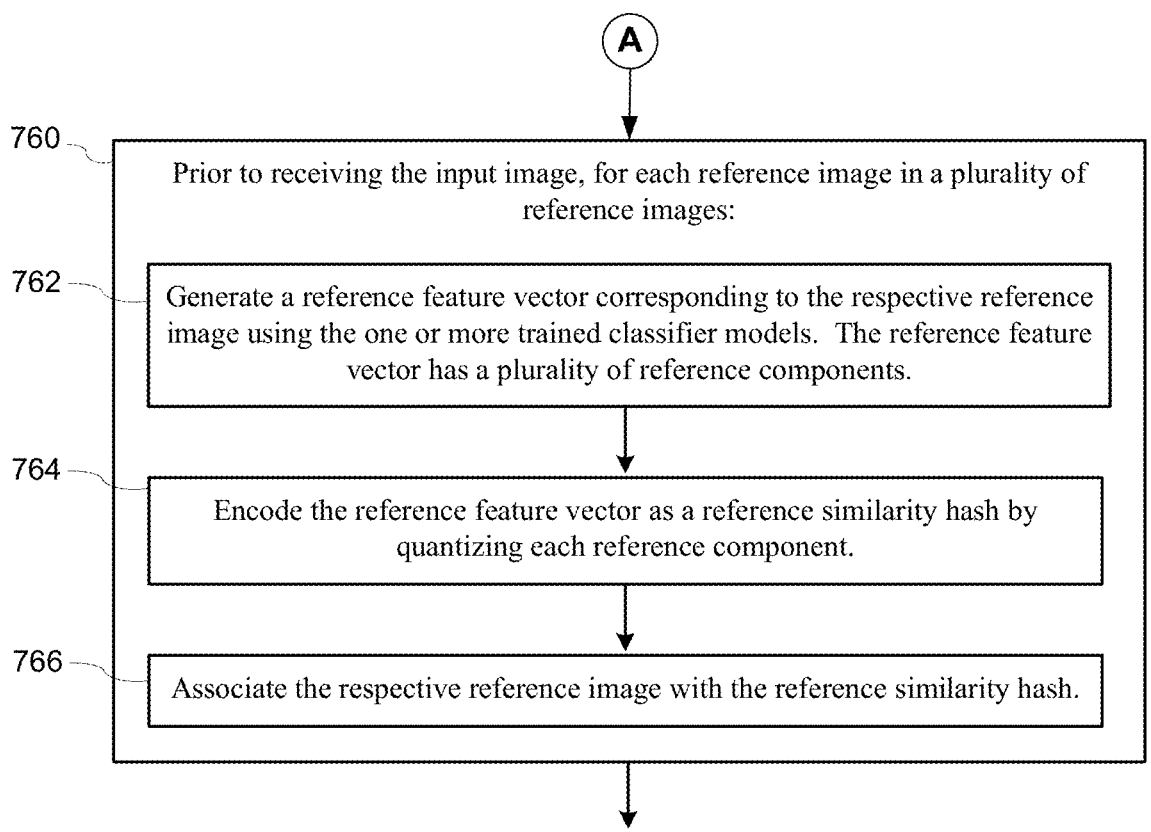

Referring next to FIG. 7F, in some implementations the method 700 includes, prior to receiving the input image, preprocessing each reference image. For each reference image in a plurality of reference images, The method performs a sequence of steps 760 that includes generating (762) a reference feature vector corresponding to the respective reference image using the one or more trained classifier models. The reference feature vector has a plurality of reference components. The sequence of steps also includes encoding (764) the reference feature vector as a reference similarity hash by quantizing each reference component. The sequence of steps also includes associating (766) the respective reference image with the reference similarity hash. For example, the hashing engine 328 performs the operations shown in FIG. 7F on each image in the image or document library 120 prior to receiving an input image (e.g., while in an offline mode) via the image or document search application 106.

Office Document Analysis

Figure 8A:
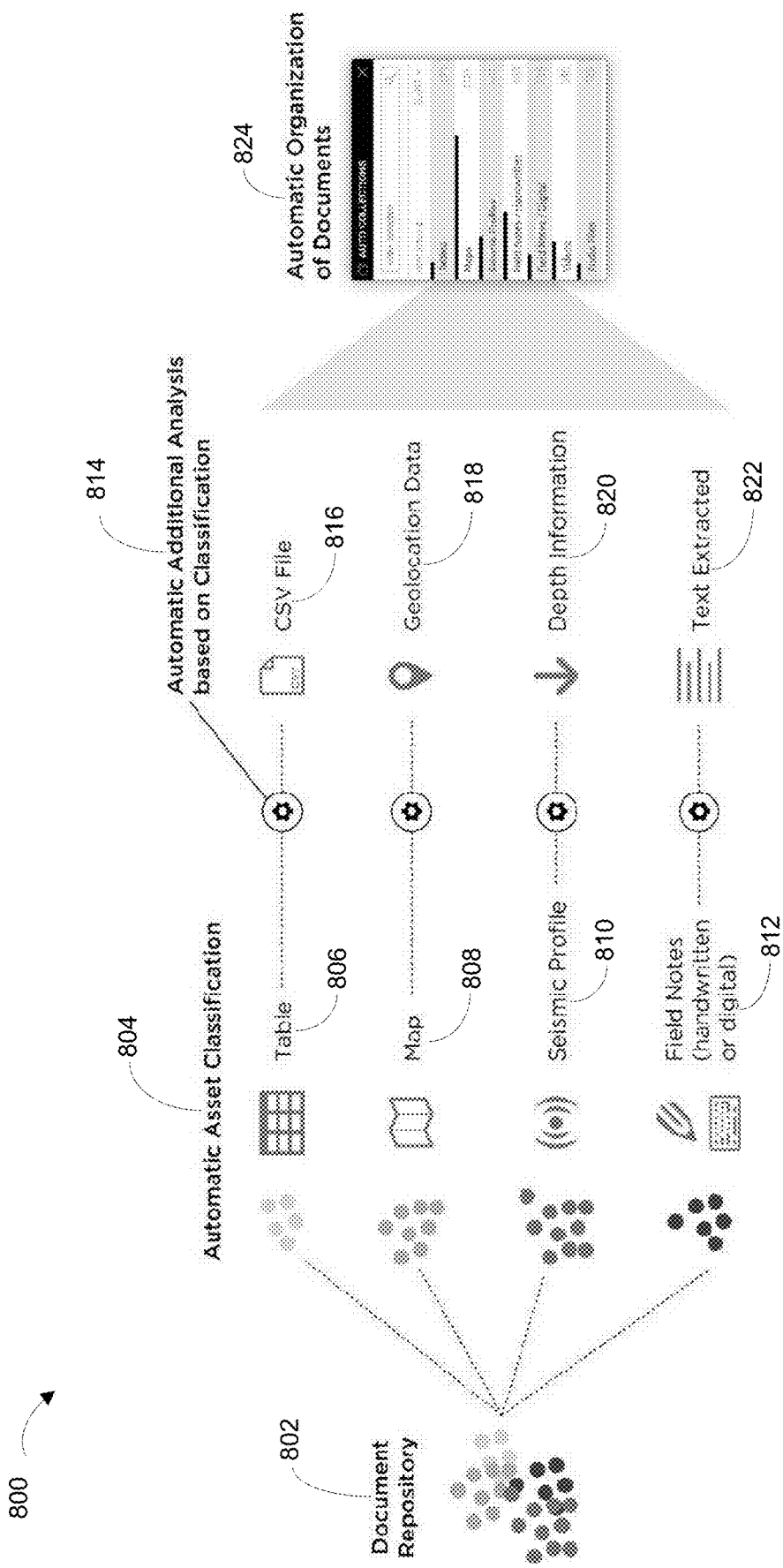
FIG. 8A illustrates an office document (sometimes called a printed document) organization system, according to some implementations.

Some implementations classify documents using a CNN or similar classifier algorithms to determine a "class" for each page of a document. FIG. 8A illustrates an office document (sometimes called a printed document or a document) organization system 800, according to some implementations. Some implementations input pages of office documents (e.g., from a document repository 802) as input images to one or more classifiers, and the one or more classifiers determine (804) a document class for each page. Some implementations determine an overall class for a document file containing multiple pages. In some implementations, once a document class is determined, additional class-specific processing (814) is applied to extract semantically important information from the document body. In some implementations, both the class and the contents are used in searching and organizing documents. For example, in FIG. 8A, tables 806 are analyzed further (814) to obtain output or processed CSV files, according to some implementations. In some implementations, maps 808 are processed (814) to obtain geolocation data 818. In some implementations, seismic profile data 810 is processed (814) to obtain depth information 820. In some implementations, field notes (either handwritten or digital) 812 are analyzed to extract text 822. Thus, since the entire process is performed without human intervention, some implementations organize (824) vast collections of office documents in a fully automatic manner.

Office Document Classifier

Some implementations use CNNs that are trained to recognize features in an image. Each network is a topological connected network of nodes which is then trained using millions of pre-classified images. Each node (sometimes called a neuron) performs one of several convolutional functions, accepts an input, and generates outputs. The nodes are typically arranged in several layers, with each successive layer connected to the previous layer. In some implementations, the final layer of the network represents keywords along with confidence values. The higher the confidence, the stronger the relationship between the keyword and the input image. Training the network iteratively adjusts the weights associated with each node. The network is thus trained to process a new image and generate a set of keywords that characterize the input image.

Typical training sets include a large number (sometimes millions) of widely available images that have been classified a priori in some manner. Each pre-classified document contains one or more keywords that match a keyword taxonomy used in a final layer of the network. Once trained, the base network (all node layers except for a final keyword layer) is reused by retraining the last layer of the base network to recognize new keywords. Therefore, the training sets have a strong influence on the features that can be recognized. Common training sets use images from the Internet, such as photographs. Rather than using typical photographs, some implementations train the base network using images of office document pages, which results in a base network that is particularly attuned to features such as tables, spreadsheets, paragraphs of text, simplified diagrams, and images embedded within these documents.

Some implementations process scanned documents with unique characteristics (e.g., exceptionally large resolutions, transparencies, physically damaged documents, and incorrectly oriented documents). These characteristics present unique issues that are not easily captured by conventional CNNs.

R-Known Document Classifier

In some situations, such as when first beginning to understand the requirements of a new market vertical with unique document types, some implementations use a training set of pre-classified documents. Some implementations support the ability to generate an arbitrary number of pre-classified training documents through tedious hand-classification. Some implementations determine a number R of pre-classified documents that are required and determine the document class of a new document using a deterministic function called a "classifier."

Some implementations use a classifier that is a type of unsupervised-learning classifier. In some implementations, a classifier system is provided with examples of data and result, and the system repeatedly measures prediction errors. The system makes adjustments accordingly. Unsupervised learning extracts patterns from data that didn't have any a priori labels.

Some implementations use a R-Known classifier that uses supervised and unsupervised learning. It is noted that the auto-clustering algorithms described above in reference to feature vectors are also a mix of supervised and unsupervised classification. Some implementations use supervised learning to train a CNN, and then use the results of that CNN on unlabeled data to determine meaningful clusters. In some implementations, new documents with known classes are input to a system sequentially. Eventually, the system is trained to determine classes for documents without known classes. As documents are input, the system computes a feature vector. In some implementations, the feature vector is computed by a pre-trained CNN. In some implementations, the feature vector defines a point in an n-dimensional space. By computing the distance of new documents to the existing documents in this space, the system makes a prediction as to what category a given document belongs to.

In some implementations, a system predicts documents classes, and compares the classes to known classes. The comparison yields a confidence value for the predictions. Once that confidence value crosses a certain threshold, the system starts classifying documents without a preassigned class. In some implementations, if after a first "training" phase, the system observes documents that yield a low confidence value, the system determines if a new class has been introduced, and requires pre-assigned values (e.g., user-provided parameter adjustments) until confidence is back up to desired levels.

In some implementations, the system described above is used to inform a supervised training process of a more complex classifier.

In some implementations, the R-Known classifier performs a sequence of steps. The sequence of steps includes a training step that uses a set of documents (e.g., as images) with known type or class information. Subsequently, the sequence of steps includes, for each document (e.g., input as an image), performing a similarity feature vector search on that document or image. Some implementations use a threshold minimum score for determining a minimum number (e.g., 100 matches) of matched documents or images. Some implementations count image or document labels for each document and pick the most popular label as a final label for that document. Some implementations use a confidence measure (e.g., a ratio between the number of times the most popular label appeared and the number of images in the search) to determine a suitable label or class for a document or image.

Some implementations compare results from a R-Known classifier against results from retraining the final layer of an existing CNN. Some implementations use a continuous classification and training system.

In some implementations, the R-Known classifier described above is trained initially on a first market segment or vertical, and later applied for a new market vertical. For example, a system imports assets that are manually labeled, and classifies the assets using the R-Known classifier, while generating a confidence value. As the confidence of the classification improves and crosses a threshold, the system stops classifying manually classified documents, and settles on a final number R of documents required to achieve a given confidence value. For a new market vertical or segment, the system is trained with a set of R known or manually classified assets, and begins classifying new documents once a calculated confidence measure reaches a threshold value, according to some implementations.

Post-Classification Analysis

In some implementations, once documents are classified, a document classification system extracts semantic information from the document using domain-specific processing of each document type. For example, a "map with key" document type is further processed by a sequence of vision algorithms. A rectangle identifier is applied, which is then followed by an OCR extraction within each rectangle. This is subsequently followed by a comparison of the extracted text against a taxonomy of known words used in map keys, such as geographic locations, land types, country names, site names (e.g., campground, oil well, or house), scientific categorizations, zoning, or other domain-specific information.

In some implementations, non-office format documents, such as video, audio, photographs, scientific, and other image type documents, are initially classified using techniques described herein, and subsequently a classification-specific analysis is applied to further analyze the classified documents.

Automatically Generated Analyzers

Some implementations generate semantic analyzer pipelines 114 for each document type using a neural network that searches the space of analyzers. Some implementations collect keyword groups from document metadata during initial processing and/or Optical Character Recognition. Subsequently, some implementations cluster the keywords using standard clustering algorithms, and compare the clusters against each known document type looking for matches. Once the rate of matching reaches a predetermined threshold (e.g., ninety percent of documents matched), some implementations then reverse the process, and apply the keyword detection on unclassified documents to determine the document classes.

Some implementations search the space of analyzers using iterative substitution of various algorithms. An example that uses regular expression analysis is described below, according to some implementations. Some implementations apply various algorithms, including regular expression analysis (sometimes called regex), date matching, aspect ratios, and other identifying information to determine the document class.

Some implementations classify each document and add a label using a CNN with a retrained last layer. Some implementations use a predetermined set of groups or classes to classify one or more documents. Some implementations sort documents using feature vectors. In some implementations, a document belongs to multiple groups, but each group is sorted in a way so as to search for documents in an efficient manner.

An example of regular expression matching illustrates some of the techniques described herein. A regular expression language, such as the language used by Linux command line tools, can be viewed as a simple vector of characters consisting of constants and wildcards, such as *, [a-z], and so forth. Some implementations constrain the space of input characters to a limited number of characters and a limited number of wildcards. Some implementations use various iterative techniques, such as John Koza's genetic algorithms, or the family of gradient descent techniques, and compare the number of matched items (e.g., matching a known set of expressions from a known set of documents) against the length of the regular expression as a quality metric. Some implementations label an input document depending on the level of match (e.g., a predetermined or a user-provided threshold).

Scanned Document Enhancements

Some implementations enhance document scanning using various techniques. These techniques are used, for example, when documents are not standard 8½"×11" prints on high quality paper, when documents are not scanned properly, or when there is an enormous number of documents. Sometimes, the scans result in digital images that are in the Giga-pixel range (e.g., 120,000 pixels×14,000 pixels produces 1,680,000,000 pixel images are common). The large sizes cause problems for OCR software that is designed to work on images in the mega-pixel range (e.g., 1,600 pixels× 1,200 pixels produces 1,920,000 pixel images). In some situations, large-sized documents are not constrained to a single text orientation. For example, different areas of a document have text that have different orientations depending on the information. Sometimes, documents are not on paper, but instead printed on transparent media. Sometimes, due to these variations, documents tend to be scanned backwards. Sometimes, the documents are very old, and have issues like medium degradation, ink that spreads over time, or fonts and type sizes that are not suitable for OCR.

Some implementations address some of the problems discussed above by using preprocessing steps (e.g., using a preprocessing semantic analyzer) after a document is scanned into a digital image, but before an OCR process (e.g., an OCR-based semantic analyzer) has occurred. Some implementations determine a distribution of brightness across digital images of documents to estimate the quality of a scan, and subsequently use that information to automatically adjust the contrast and other values of the image to get it into a range that is optimal for the OCR process. Some implementations slice the image into small sections and apply the OCR to those sections separately to avoid running into image size limitations of OCR methods. Some implementations slice the image into sections based on a knowledge of the layout of the document (e.g., knowledge derived from the previous document classification steps). Some implementations use the knowledge of the document layout to make intelligent decisions about where to cut the image. In some implementations, when there is little or no information about the layout of the document, the image is divided into partially overlapping tiles and then the OCR is applied to each tile. Some implementations make sure the tiles are partially overlapping. For example, when text on a page is cut in one slice, some implementations make sure that the text will be undamaged in the neighboring tile. When text is cut between slices, some implementations use the text location information (e.g., bounding polygons) provided by the OCR process to reconstruct the sliced text as well as to eliminate any text that is scanned twice in the overlapping area.

If the OCR process does not handle text running in different directions, some implementations scan each tile multiple times, rotating the tile between scans. Typically, four scans, with 90 degree rotations between each scan, are sufficient, as text running in different directions still tends to align to at least one edge of the document. If text does not align, some implementations use even more scans.

Processing of Transparencies

Some implementations process transparencies using special techniques. If a document is a transparency, it is not always clear which side of the document is the "front" of the document. Sometimes, this can be exacerbated by misleading information (e.g., sometimes tracking barcodes, in the form of stickers, are attached to transparencies on the wrong side). In these cases, some implementations double the number of scans required by reversing (sometimes called flipping) each image tile before applying the OCR process. In some implementations, this process results in two sets of data per tile: one set of data that has useful text, and the other that does not. To determine the useful set, some implementations compare the OCR output against a dictionary of common words in the language the document was written in. In some implementations, the set that has more words that can be found in a dictionary is considered to be the "front," and the other set (the "back") is discarded. If the language the document was written in is unknown (or unrecognizable), some implementations perform a similar comparison, but this time at the text character level. Some implementations determine a set of text that has strings of characters that are more likely to be found in a human language, choose that set as the "front," and discard the other set.

Some implementations preserve location, rotation, and information on whether a tile is a "front" or a "back" for each tile, and scan. When the OCR process delivers output (e.g., bounding polygons), some implementations process the transformational data (through standard geometry techniques) to reconstruct the OCR results as if the entire document had been processed with a single OCR pass.

Geolocation Processing

Figure 8B:
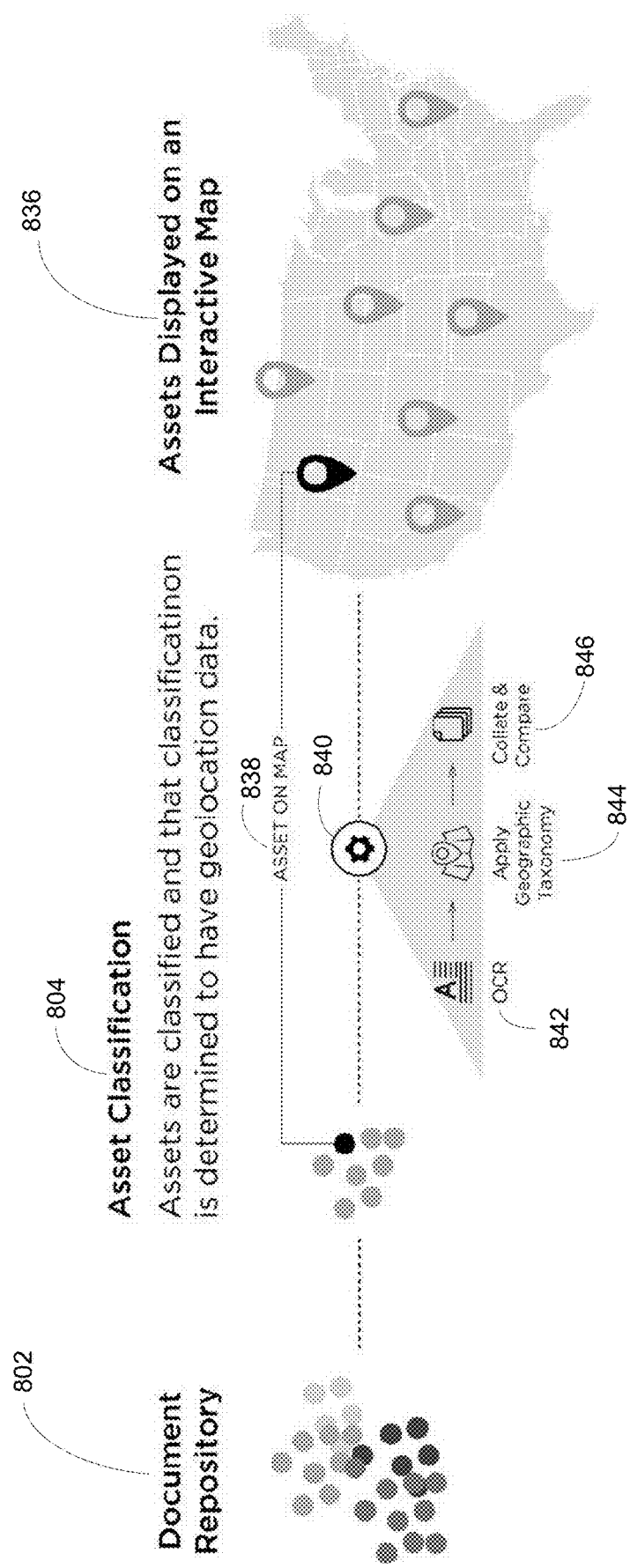
FIG. 8B illustrates locating documents on a map, and using geographical analysis and selection techniques to explore the data, according to some implementations.

As illustrated in FIG. 8B, some implementations locate (838) each document 802 on a map (e.g., an interactive map 836) and use geographical analysis and selection techniques (840) to explore the data. Some OCR (842) implementations determine latitude or longitude information (and other numerical location data) in images. Some implementations handle typical problems associated with OCR data (e.g., paper or ink degradation over time, problems with scanner, fonts and type sizes not good for OCR). Some implementations handle images of different styles or forms irrespective of the arrangement of the location data. Some implementations handle labels separated from data by a distance (e.g., "Latitude 30° 9' 21'""). Some implementations handle incorrectly scanned symbols (e.g., the "degree" symbol is sometimes scanned as the letter O or the number 0, the "minutes" symbol is sometimes scanned as the number 1 or letter I or L, or the "seconds" symbol is scanned as "11", "II", or some combination thereof). As a result, the example above might be scanned as "300912111". Some implementations handle a wide range of formats (e.g., non-standard formats) for encoding latitude or longitude numbers.

After OCR processing (842) (as described in the Scanned Document Enhancements section), some implementations apply geographical taxonomy analysis (844) to the resulting text. Geographical taxonomies include widely known formats for encoding geographical location data, such as latitude and longitude (further described below). In some implementations, the results are cross-correlated with other information extracted from the document (e.g., via a separate analysis), and documents corresponding to specific geographic regions are collected or collated (846).

Some implementations use intra-document locational data generated from the OCR process to reconnect labels separated from their respective data. Some implementations use data returned from the OCR process (e.g., polygon vertex coordinates) specifying the location of the discovered text. Some implementations iteratively extend polygons (e.g., from output returned by the OCR process). For example, a polygon is extended in the direction of text until the polygon intersects with other OCR polygons, and "join" text from the intersecting OCR polygons.

Some implementations use a set of regular expression rules (e.g., rules such as "Latitude[spaces][number][degree symbol][spaces][number]", which describe general forms of text) to determine match text on a page. Some implementations allow for ambiguity in the rules. For example, some implementations allow for misspellings and abbreviations of the word "Latitude." Some implementations handle incorrect scans, like a degree symbol being misread as a zero.

Some implementations determine the probability of a match (sometimes called "confidence") based on the level of ambiguity. For example, if the word "Latitude" is misspelled, the word "Latitude" is very far away on a page from a number, and the number looks like it might have had some symbols incorrectly scanned, then all these factors cause the probability of a match to drop. Some implementations use thresholds based on the probability, and then only accept the data that has a sufficient match probability.

Some implementations make use of the document classification in the analysis. If a document is of a certain type (e.g., a well site map), some implementations eliminate certain types of ambiguities. If the document has a specific form (e.g., a standard form developed and used by Amoco in the 1980s), then some implementations further eliminate ambiguities and discard erroneous interpretations of the OCR data.

In some implementations, a labeling phase labels each document with the document type, complementing information about location of numerical location data on the document (e.g., derived from OCR polygons), along with a set of ambiguities that tend to occur on that document type. Some implementations use such information to train a new set of document analyzers. Some implementations complement automatically generated rules with user-provided rules.

Spreadsheet and Table Extraction

Some implementations use specialized CNNs and related algorithms to process spreadsheet documents to extract useful information. In some implementations, a neural network is trained using a large number of digital spreadsheet documents. Some implementations also perform OCR and convert the resulting text into semantically useful data leveraging the fact that the document is in a tabular format. For example, some implementations convert the plain paragraphs of OCR text into a CSV or Excel file.

In some implementations, digital spreadsheets are used as training data to train a neural network (e.g., a CNN), leveraging the row and column layout, to extract relevant business information using a white list of keywords, such as revenue, expenses, COGS, disbursements, cash flow, income, accrual, travel, contractors, employees, or headcount. Once the network is trained, the network can handle unknown documents and recognize such keyword values from the raw pixels corresponding to the documents.

In some implementations, when digital spreadsheets are input, the cells of each document are classified as containing either constant text or a formula. Some implementations process the binary data to identify odd patterns, such as a single constant value within a large block of formulas, which may identify errors within the spreadsheet formulas. Some implementations identify other types of errors, such as when a value identified as an expense is in a column identified as "Revenue," or vice versa. In some implementations, more advanced patterns are detected. For example, a final row of values is interpreted as a sum of the column or row.

Bag of Words

Some implementations classify a document based on the words within the document. For digitally-borne documents (e.g., a word document or a spreadsheet), some implementations use the words included in the file. For scanned documents, some implementations perform OCR to identify the words. In some implementations, instead of training and evaluating a neural network using images, a neural network is trained using a set of words that have been classified by document type. The neural network can then identify documents for a new document class using a bag of words.

Some implementations begin by eliminating common words (sometimes called "stop words"), including prepositions and basic identifiers. In some implementations, the stop words match the parsers used by common search engines, such as ElasticSearch. In some implementations, a subset of semantically interesting words is statistically evaluated to generate histograms to pick out the most common high-value words. Some implementations search for outlier and infrequently used words of high semantic value. In some implementations, the resulting "bag of words" is input to a neural network that is trained using vectors of pre-classified words.

Hierarchical Page Aggregation

Figure 8C:
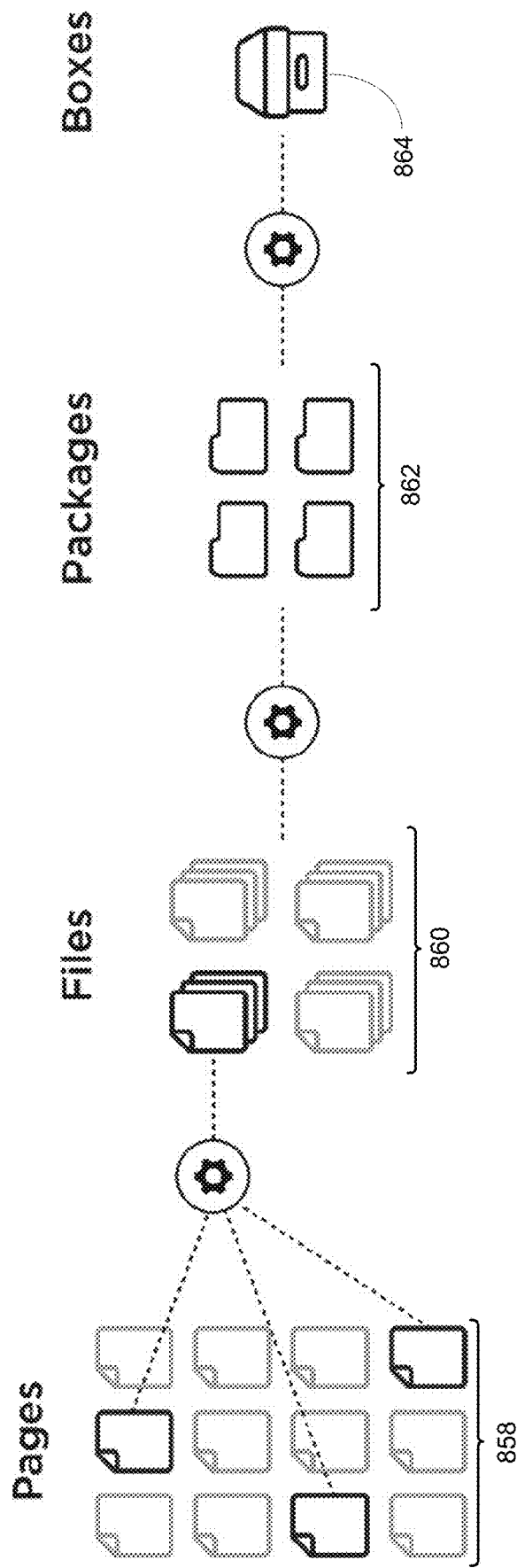
FIG. 8C illustrates organization of documents as files, packages, and folders or (digital) boxes, according to some implementations.

As illustrated in FIG. 8C, in some implementations documents are input as separate images, without ordering or grouping information, and subsequently grouped as individual pages 858 into their original multipage files 860. The related files are then grouped into aggregate packages 862 and packaged into logical higher-level groupings 864 (sometimes called boxes, such as digital boxes of data corresponding to individual months).

Scanned documents are typically broken into separate pages that are scanned in parallel, thereby losing ordering information. To organize such documents, some implementations scan the documents with blank pages inserted between individual files. Some implementations identify the blank pages as potential boundaries for the grouping of pages into files, and collect the candidate pages into a logical group. Since pages from adjacent files may still be within this group, some implementations perform further processing by first performing OCR on the pages (e.g., along the top and bottom edges) with the intent of identifying page numbers. In some implementations, the pages are rotated and scanned, and/or flipped and scanned, as described above in reference to scanned document enhancements. Some implementations check for common numbering formats using regular expressions (e.g., "p#" or "page #"). In some implementations, page numbers are used to exclude and order documents within the original file.

In some implementations, files are grouped into document packages by identifying information (e.g., unique IDs, or strings) extracted during page content analysis. During the page analysis, some implementations perform OCR on a full page of text, using standard techniques, to extract common semantic strings, such as social security numbers, drivers' license numbers, or other personal information. Some implementations also perform domain specific extraction of semantic information (e.g., a loan identification number, a well site, a patient record identifier, or other unique strings). Some implementations depend on the scanned document enhancements or regular expression matchers described above in reference to the automatically generated analyzers section.

Some implementations group files into packages based on a user-specified set of document classes. For example, mortgage loan applications are grouped in a number of different ways, based on SSN, a loan ID, an expected set of documents for each loan application further based on a credit report, a site report, a loan application form, an internal bank document, or an originating loan information. As another example, documents on oil and gas wells are grouped together by the well name, the geographic location of an individual well or locations of multiple wells within a "basin," or the contracting company. The well name is extracted, for example, by comparing text within the document against a known list of worldwide well names. The geographic information is extracted, for example, using the techniques described above in the geolocation section. The contracting company can be extracted, for example, either by comparing the OCR text against a whitelisted set of company names, or via visual (e.g., image) analysis of the logos in the document. Some implementations use common techniques for logo analysis, including Support Vector Machines and CNNs, trained on known company logos.

In some implementations, packages are further organized (into digital boxes or folders) based on domain-specific criteria (e.g., legislative districts, countries, offshore oil regions, or similar geographic identifiers), or based on user-identified storage packages for the original physical documents.

FIGS. 9A-9M provide a flowchart of a method 900 of analyzing and organizing (902) printed documents (sometimes called printed office documents, or office documents), according to some implementations. The method 900 is performed (904) at a computer (e.g., a server 110, a client device 104, or a combination thereof) having one or more processors, and memory. In some implementations, the computer also has a display to display results of a computation. The memory stores (906) one or more programs configured for execution by the one or more processors.

The method 900 includes receiving (908) one or more printed documents. Each printed document includes a respective one or more pages. For example, a client device 104 receives an input document 108 via an image or document organizer application 106, according to some implementations. The method 900 includes performing (910) a sequence of steps for each printed document that includes, for each page of the respective printed document (912), scanning (914) the respective page to obtain an image file.

Figure 9A:
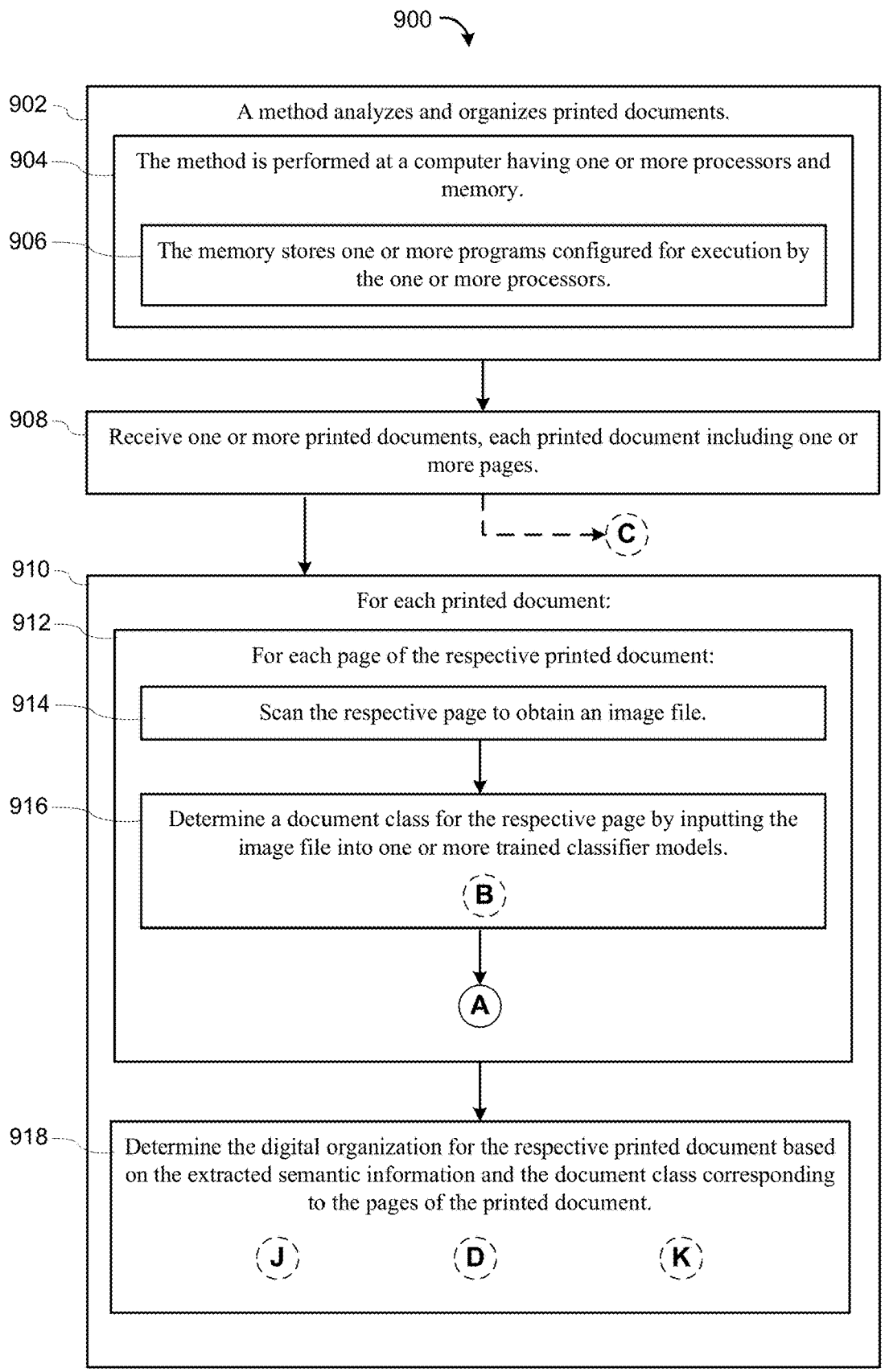
FIGS. 9A-9M provide a flowchart of a method of analyzing and organizing printed documents (sometimes called printed office documents, or office documents), according to some implementations.

The steps (912) of the method 900 also includes determining (916) a document class (e.g., one of the document classes 132) for the respective page by inputting the image file to one or more trained classifier models 116. Referring next to FIG. 9C, in some implementations, the one or more trained classifier models are trained (926) using printed office document pages (e.g., tables, spreadsheets, paragraphs of text, diagrams, and embedded images) from a first market segment, and the one or more printed documents belong to a second market segment that is distinct from the first market segment. An example of a CNN classifier for classifying documents is described above in the section on Office Document Analysis.

In some implementations, the method 900 also includes retraining (928) the one or more classifier models 116 to classify documents for the second market segment by performing a sequence of steps. The sequence of steps includes generating (930) a confidence value based on a successful classification of a set of documents from the second market segment. Each document in the set of documents has a known document class. The method determines (932) whether the confidence value exceeds a predetermined threshold. When the confidence value does not exceed the predetermined threshold, the method continues (934) to train the one or more classifier models with documents from the second market segment until the confidence value exceeds the predetermined threshold. An example of retraining classifiers for different market verticals is described above in the section on R-Known Document Classifier.

Figure 9B:
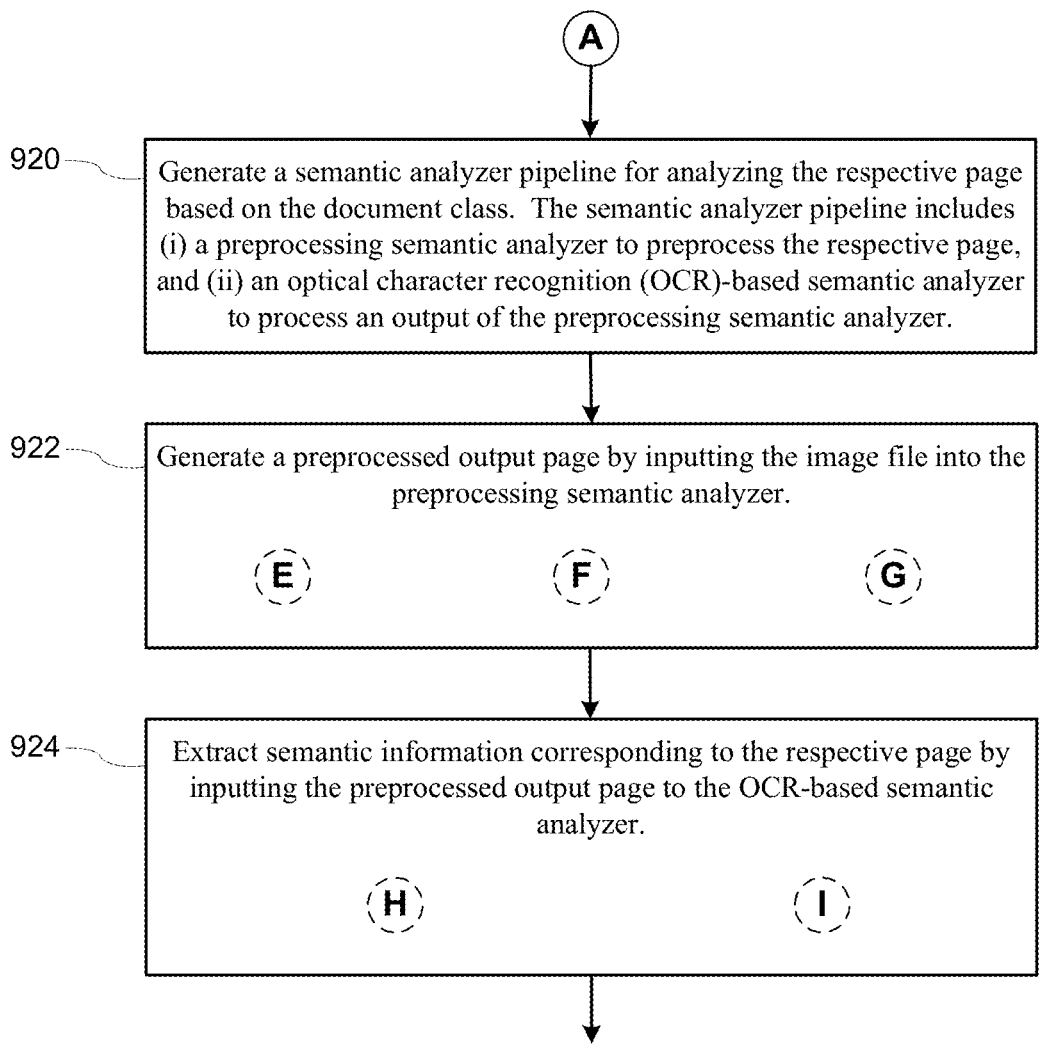
Figure 9C:
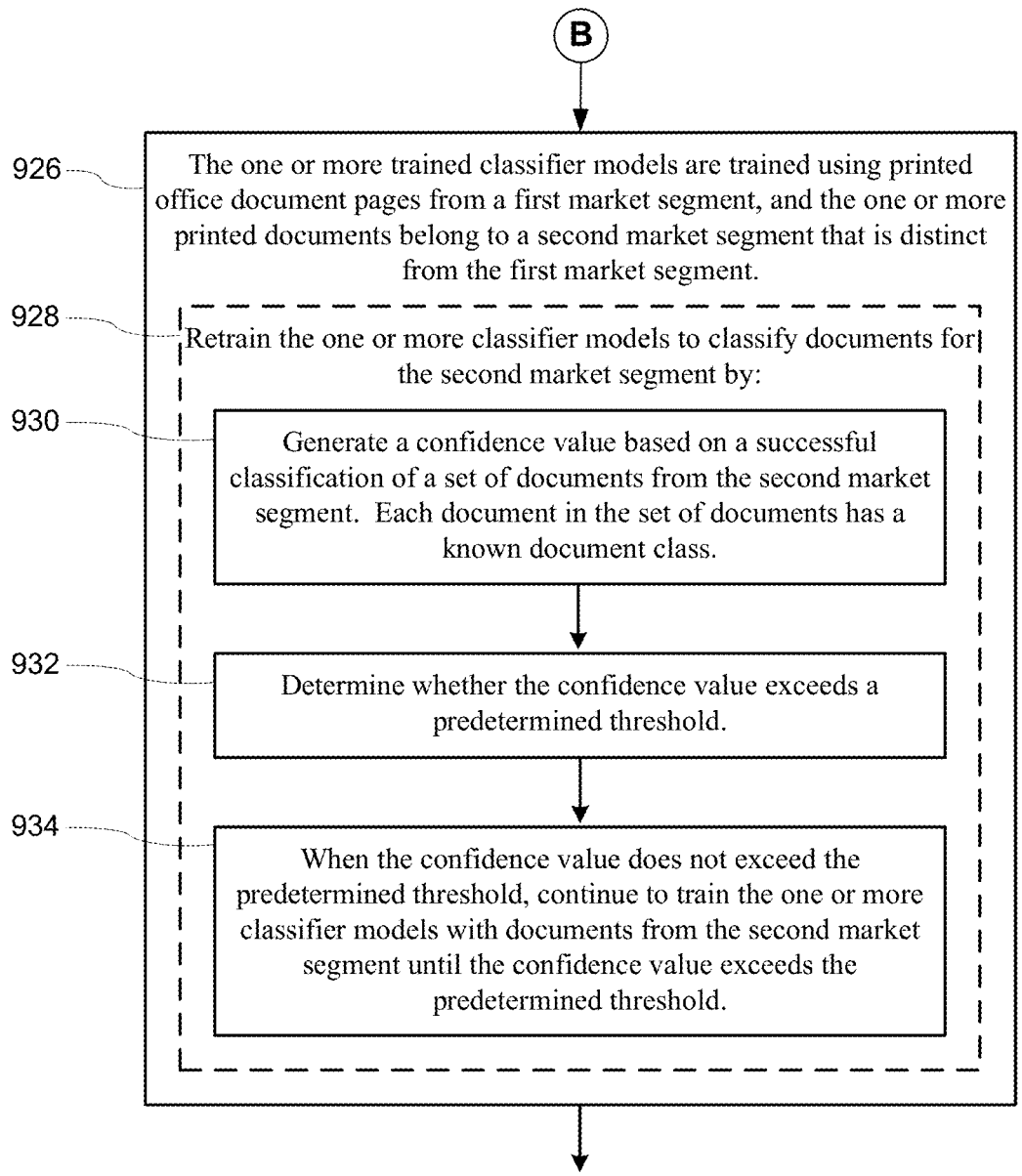

Referring now back to FIG. 9B, the method 900 also includes generating (920) a semantic analyzer pipeline for analyzing the respective page based on the document class 132, the semantic analyzer pipeline includes (920) (i) a preprocessing semantic analyzer to preprocess the respective page, and (ii) an optical character recognition (OCR)-based semantic analyzer to process an output of the preprocessing semantic analyzer. For example, the server 110 generates, using the semantic analyzer pipeline generation engine 334, one or more semantic analyzer pipelines 114, according to some implementations. Examples of automatic generation of analyzers are described above in the section on Automatically Generated Analyzers. In some implementations, the method 900 includes storing the generated semantic analyzers 118 into the memory 314.

The method 900 also includes generating (922) a preprocessed output page by applying the preprocessing semantic analyzer to the image file. Examples of preprocessing are described above in the section on Scanned Document Enhancements, according to some implementations. Referring next to FIG. 9G, in some implementations, generating (922) the preprocessed output page includes estimating (960) the scan quality for the scanned image, and adjusting (962) print attributes, including contrast, for the scanned image to obtain the preprocessed output page. This uses the distribution of brightness across the scanned image. Referring next to FIG. 9H, in some implementations, generating (922) the preprocessed output page includes determining (964) the document layout for the respective page, subdividing (966) the scanned image into a plurality of image sections based on the document layout, and combining (968) the plurality of image sections to obtain the preprocessed output page.

Figure 9D:
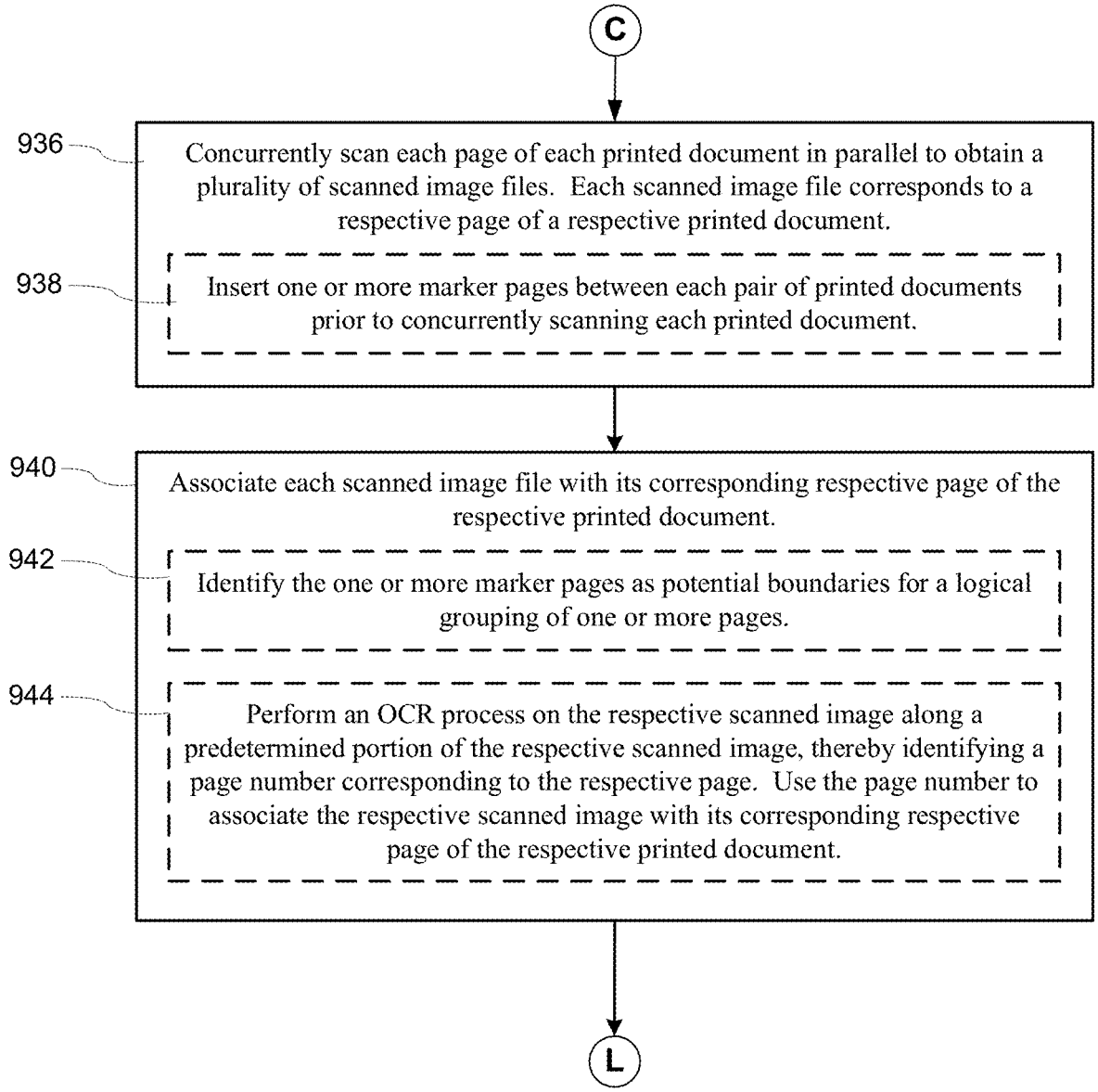
Figure 9E:
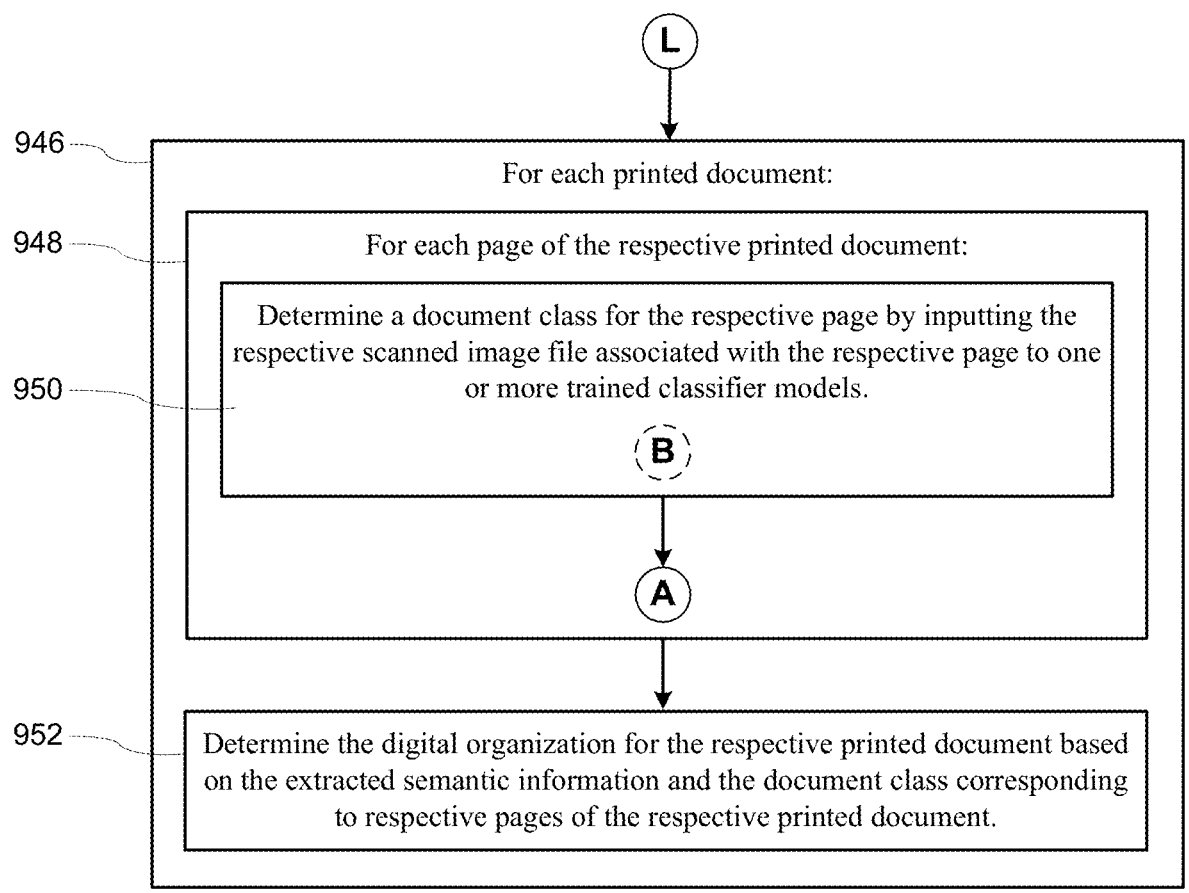
Figure 9F:
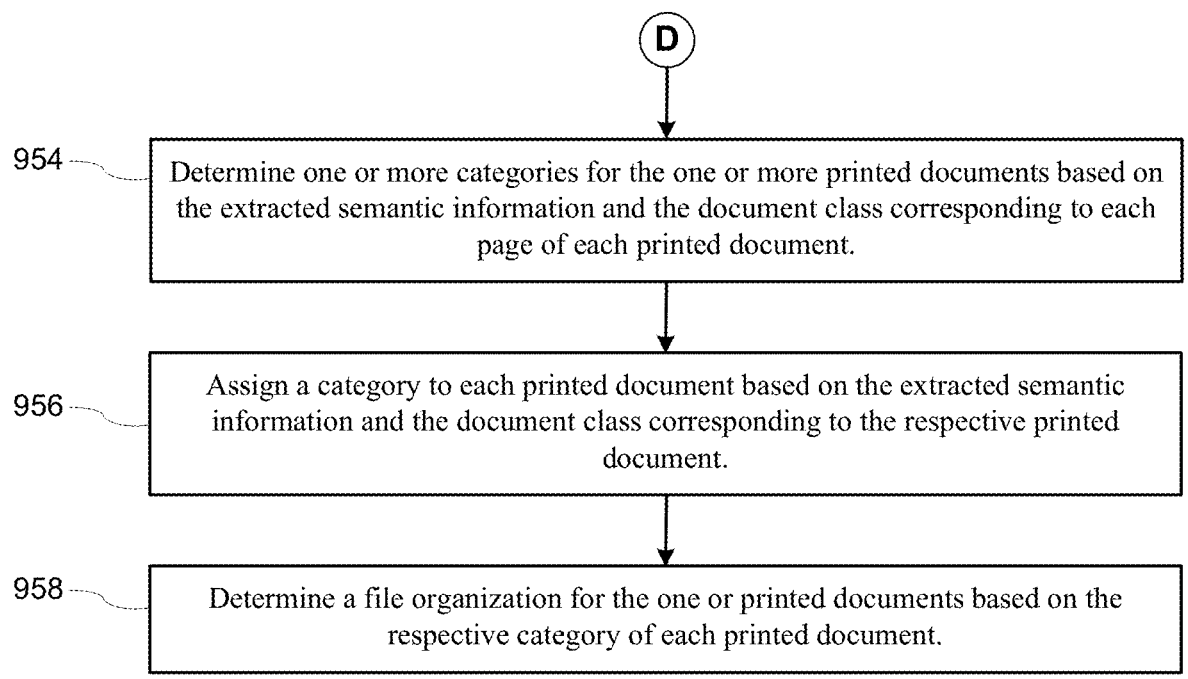
Figure 9G:
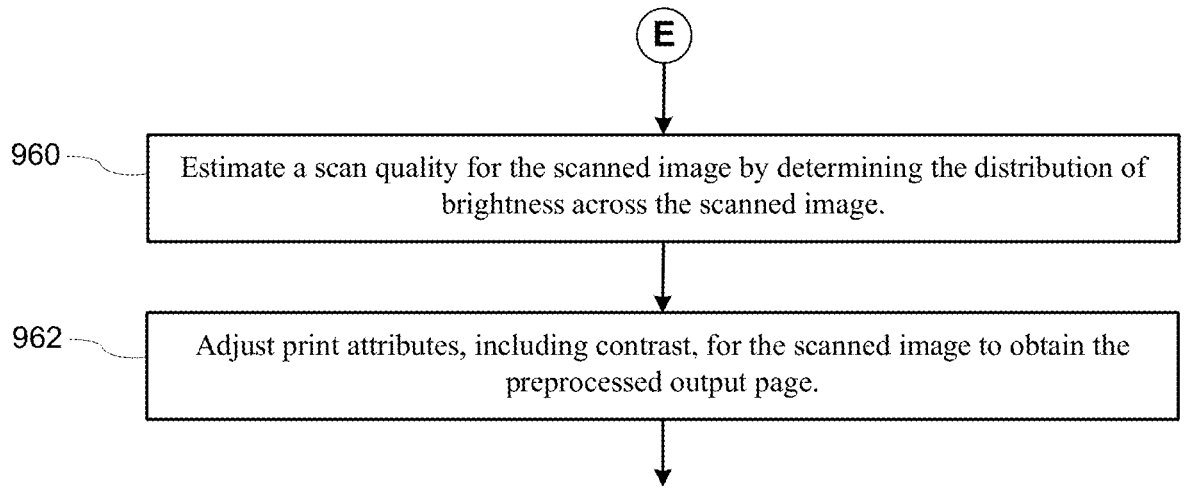
Figure 9H:
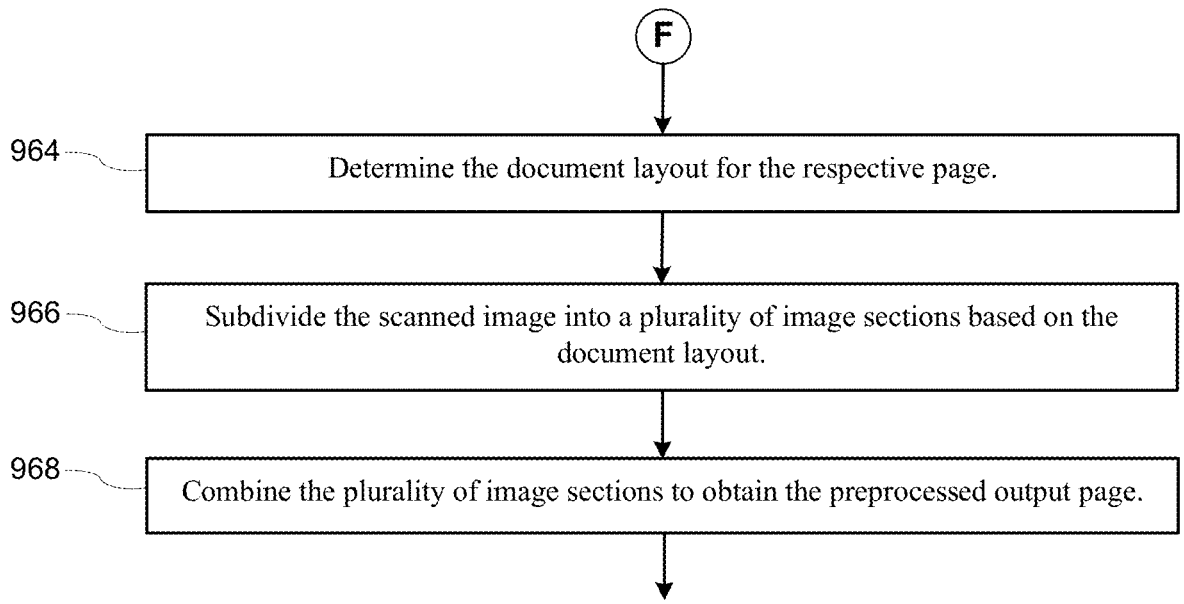
Figure 9I:
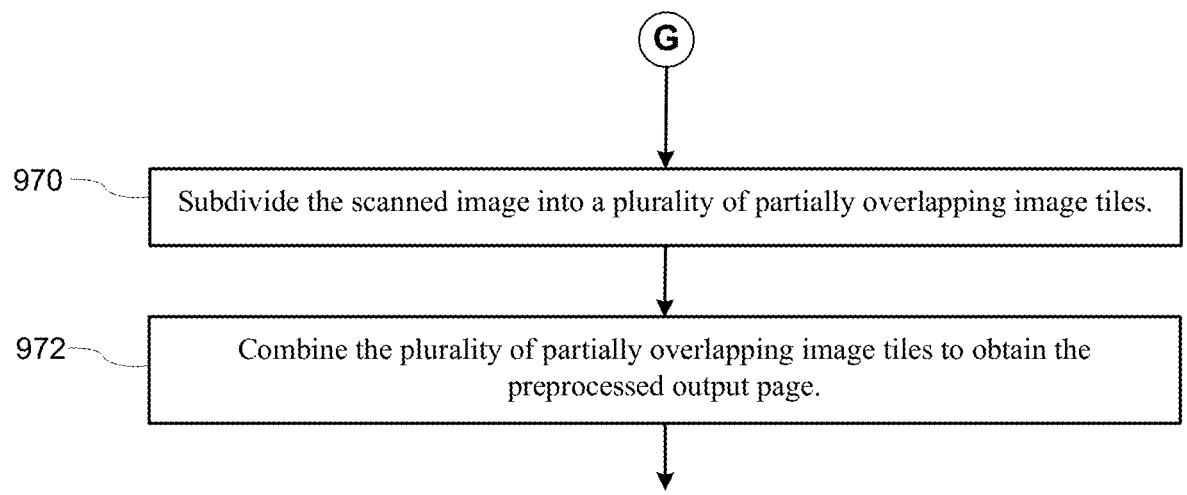

Referring next to FIG. 9I, in some implementations, generating (922) the preprocessed output page includes subdividing (970) the scanned image into a plurality of partially overlapping image tiles and combining (972) the plurality of partially overlapping image tiles to obtain the preprocessed output page.

Although not shown in the flowcharts, in some implementations, the method 900 further includes determining if textual data is split between a first partially overlapping image tile and a second partially overlapping image tile by performing an OCR process (e.g., an OCR process included in the OCR-based semantic analyzer) on each partially overlapping image tile. When the textual data is split, the method uses text location information provided by the OCR process, reconstructing the first partially overlapping image tile to include the textual data and to reconstruct the second partially overlapping image tile to remove the textual data. Related examples are described above in the section on Scanned Document Enhancements.

Although not shown in the flowcharts, in some implementations, when the OCR-based semantic analyzer does not handle text running in different directions, the method 900 further includes scanning each partially overlapping image tile a plurality of times to obtain a plurality of versions of the respective partially overlapping image tile. Each time the method rotates the respective partially overlapping image tile by a predetermined angle and obtains a respective version of the partially overlapping image tile corresponding to a respective orientation. The method combines the plurality of versions of each partially overlapping image tile to obtain the preprocessed output page.

Although not shown in the flowcharts, in some implementations, the method 900 further includes determining that the respective page is a transparency. In accordance with a determination that the respective page is a transparency, the method 900 includes performing a sequence of steps (examples of which are described above in the section on Processing of Transparencies). The sequence of steps includes scanning a first side of a respective partially overlapping image tile to obtain a first version of the respective partially overlapping image tile. The sequence of steps includes scanning the second side of the respective partially overlapping image tile by reversing the respective partially overlapping image tile to obtain a second version of the respective partially overlapping image tile. The second side is opposite to the first side. The sequence of steps also includes determining whether the first version has useful text by performing an OCR process on the first version and comparing the output of the OCR process with words from a dictionary of common words. The sequence of steps also includes, when the first version has useful text, reconstructing the respective partially overlapping image tile based on the first version. The sequence of steps also includes, when the first version does not have useful text, reconstructing the respective partially overlapping image tile based on the second version.

Referring now back to FIG. 9B, the method 900 also includes extracting (924) semantic information 130 corresponding to the respective page by applying the OCR-based semantic analyzer to the preprocessed output page. Examples of extracting semantic information are described above in the section on Post-Classification Analysis, according to some implementations.

Figure 9J:
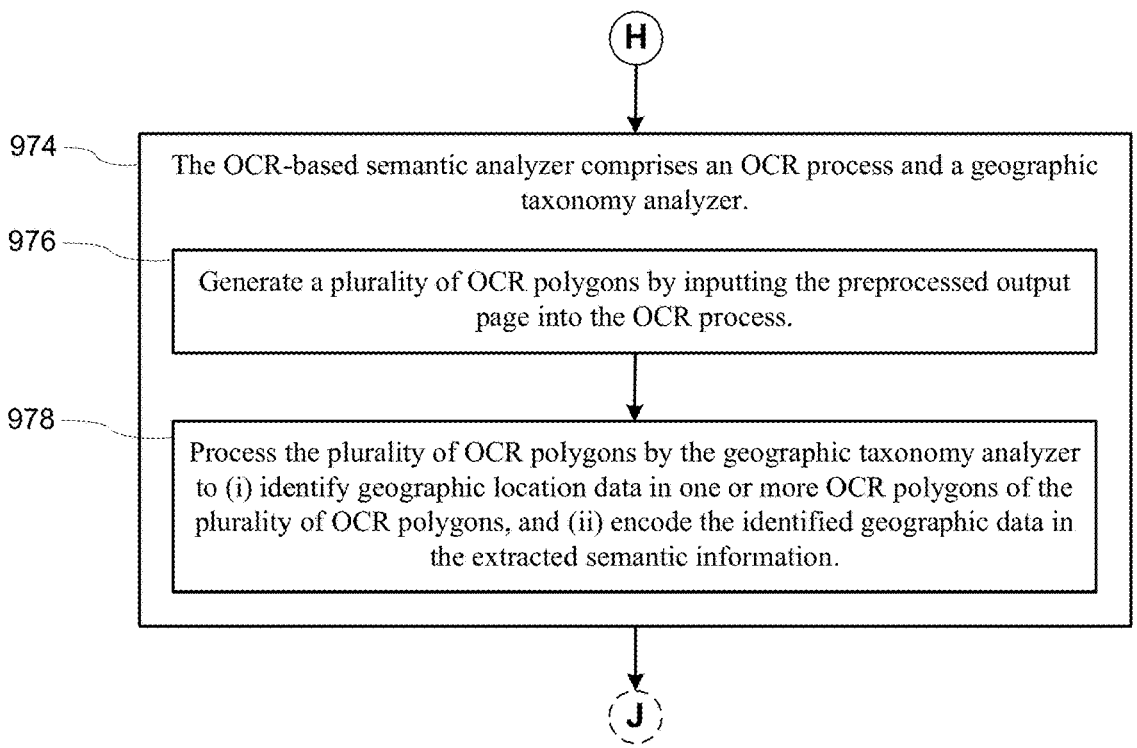

Referring next to FIG. 9J, in some implementations, the OCR-based semantic analyzer comprises (974) an OCR process (e.g., conventional OCR) and a geographic taxonomy analyzer. Extracting (924) the semantic information includes a sequence of steps. The sequence of steps includes generating (976) a plurality of OCR polygons by applying the OCR process to the preprocessed output page. The sequence of steps also includes processing (978) the plurality of OCR polygons by the geographic taxonomy analyzer to (i) identify geographic location data in one or more OCR polygons of the plurality of OCR polygons, and (ii) encode the identified geographic data in the extracted semantic information. Referring next to FIG. 9L, in some implementations, the sequence of steps also includes determining whether the document class 132 corresponds to a map with a key. When the document class corresponds to a map with a key, the method locates (988) the respective printed document on a map based on the encoded geographic data in the extracted semantic information. Examples of such techniques are described above in the section on Geolocation Processing and in reference to FIG. 8A, according to some implementations.

Figure 9K:
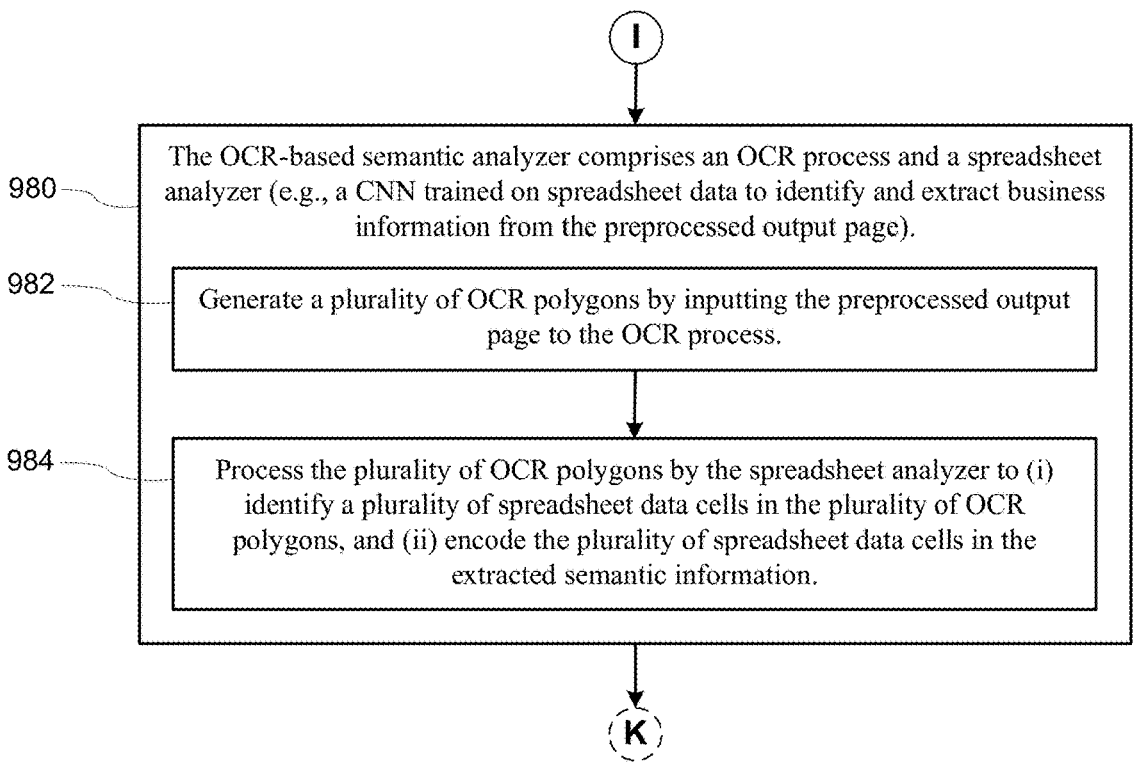
Figure 9L:
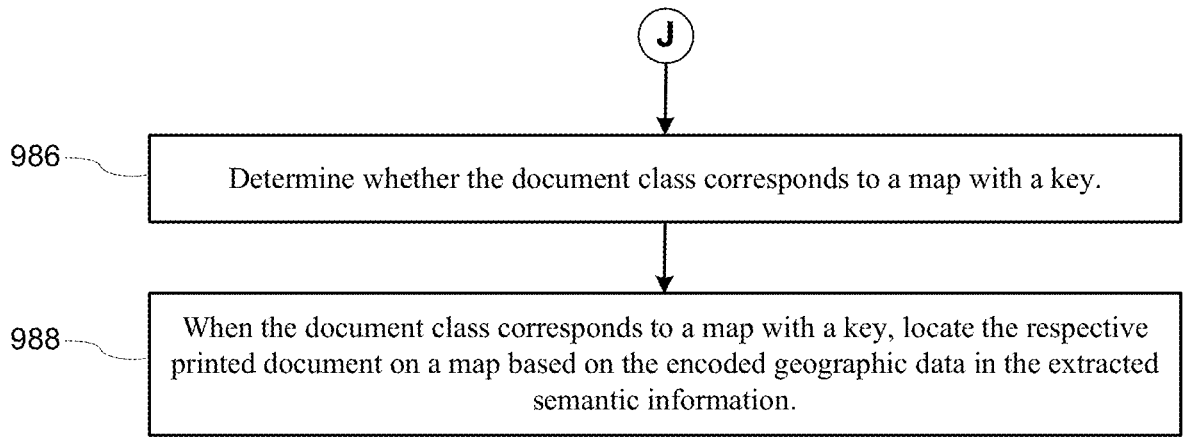
Figure 9M:
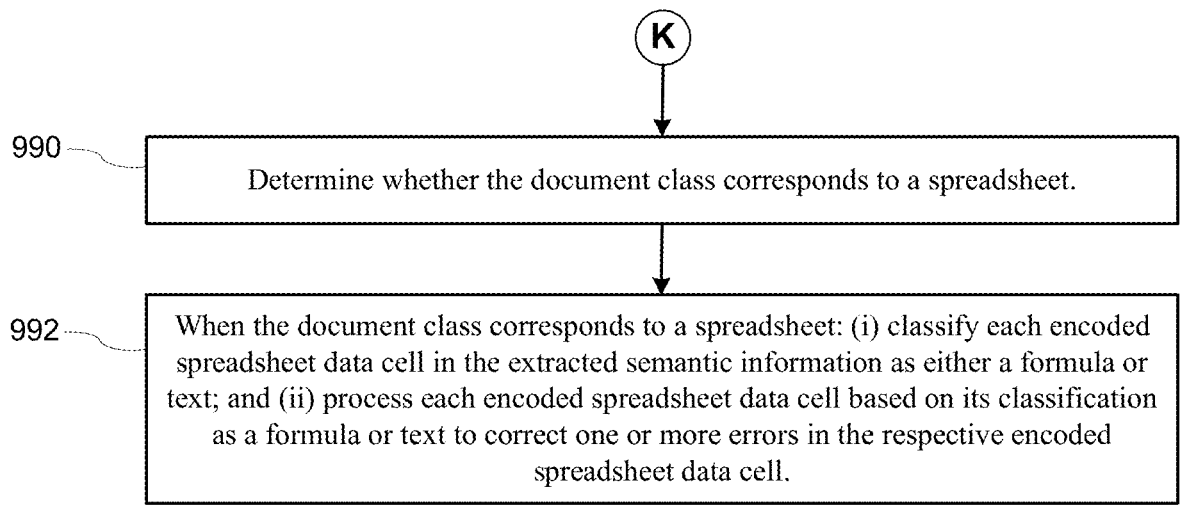

Referring now back to FIG. 9K, in some implementations, the OCR-based semantic analyzer comprises (980) an OCR process and a spreadsheet analyzer (e.g., a CNN trained on spreadsheet data to identify and extract business information from the preprocessed output page). Extracting (924) the semantic information includes a sequence of steps (examples of which are described above in the section on Spreadsheet and Table Extraction). The sequence of steps includes generating (982) a plurality of OCR polygons by applying the OCR process to the preprocessed output page. The sequence of steps also includes processing (984) the plurality of OCR polygons by the spreadsheet analyzer to (i) identify a plurality of spreadsheet data cells in the plurality of OCR polygons, and (ii) encode the plurality of spreadsheet data cells in the extracted semantic information. Referring next to FIG. 9M, in some implementations, the sequence of steps also includes determining whether the document class 132 corresponds to a spreadsheet. When the document class corresponds to a spreadsheet, the method (i) classifies (992) each encoded spreadsheet data cell in the extracted semantic information as either a formula or text and (ii) processes (992) each encoded spreadsheet data cell based on its classification as a formula or text to correct one or more errors in the respective encoded spreadsheet data cell.

Referring now back to FIG. 9A, the method 900 also includes determining (918) the digital organization for the respective printed document based on the extracted semantic information 130 and the document class 132 corresponding to respective pages of the respective printed document. Referring next to FIG. 9F, in some implementations, the method 900 further includes determining (954) one or more categories for the one or more printed documents based on the extracted semantic information and the document class corresponding to each page of each printed document, assigning (956) a category for each printed document based on the extracted semantic information and the document class corresponding to the respective printed document, and determining (958) a file organization (e.g., organizing the documents in the image/document library 120 into a hierarchy of folders or directories) for the one or more printed documents based on the respective category of each printed document.

Referring now back to FIG. 9D, in some implementations, the method 900 includes, after receiving (908 in FIG. 9A) the one or more printed documents, concurrently scanning (936) each page of each printed document in parallel to obtain a plurality of scanned image files. Each scanned image file corresponds to a respective page of a respective printed document. In some implementations, one or more marker pages (e.g., blank pages) are inserted (938) between each pair of printed documents prior to concurrently scanning each document. The method 900 also includes associating (940) each scanned image file with its corresponding respective page of the respective printed document. In some implementations, associating each scanned image file with its corresponding respective page comprises identifying (942) the one or more marker pages as potential boundaries for a logical grouping of one or more pages. In some implementations, associating each scanned image file with its corresponding respective page comprises performing (944) an OCR process on the respective scanned image along a predetermined portion of the respective scanned image thereby identifying a page number (e.g., using regular expression analysis on an output of the OCR process) corresponding to the respective page and using the page number to associate the respective scanned image with its corresponding respective page of the respective printed document. Referring next to FIG. 9E, the method 900 also includes, for each printed document, performing (946) a sequence of steps. The sequence of steps includes, performing (948), for each page of the respective printed document, determining (950) a document class 132 for the respective page by inputting the respective scanned image file associated with the respective page to one or more trained classifier models (e.g., by steps described above in reference to FIG. 9C), and performing the steps described above in reference to FIG. 9B. The method 900 also includes determining (952) a digital organization for the respective printed document based on the extracted semantic information 130 and the document class 132 corresponding to respective pages of the respective printed document, similar to step 918 described above in reference to FIG. 9A.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of searching for similar images, the method comprising:
at a computing system having one or more processors and memory:
receiving an input image having content;
generating a feature vector corresponding to the input image according to a trained classifier model, the feature vector having a plurality of components;
encoding the feature vector as a similarity hash by quantizing each component to a corresponding non-binary integer value; and
for each reference image in a plurality of reference images:
obtaining a reference hash corresponding to the respective reference image;
computing similarity between the input image and the respective reference image by computing a distance between the reference hash and the similarity hash;
determining if the computed distance is within a predetermined threshold; and
in accordance with a determination that the computed distance is within the predetermined threshold, returning the respective reference image as an image that is similar to the input image.

2. The method of claim 1, wherein each component is represented using a floating-point number, and quantizing comprises mapping each component to a corresponding integer value of a predetermined length using a linear scale.

3. The method of claim 2, wherein a majority of the components range between 0.0 and 1.0.

4. The method of claim 3, further comprising, prior to quantizing, clamping each component to a floating-point value between 0.0 and 1.0.

5. The method of claim 2, wherein the predetermined length is 4 bits.

6. The method of claim 2, wherein encoding the feature vector further comprises concatenating the integer values to form a string.

7. The method of claim 2, further comprising mapping each component to its corresponding integer value using a corresponding scale.

8. The method of claim 2, wherein a first integer value corresponding to a first component of the plurality of components has a length that is distinct from a second integer value corresponding to a second component of the plurality of components.

9. The method of claim 1, wherein the computed distance is N-dimensional Manhattan distance, where N is the number of components.

10. The method of claim 1, wherein the content comprises content selected from the group consisting of semantic content, color histogram content, facial features, words, audio content, and graphical content, and wherein the feature vector includes one or more features of the content of the input image.

11. The method of claim 1, further comprising, prior to receiving the input image:
for each reference image in the plurality of reference images:
generating a reference feature vector corresponding to the respective reference image according to the trained classifier model, the reference feature vector having a plurality of reference components;
encoding the reference feature vector as a reference similarity hash by quantizing each reference component; and
associating the respective reference image with the reference similarity hash;
wherein obtaining the reference hash for corresponding to respective reference image comprises retrieving the corresponding reference similarity hash for the respective reference image.

12. The method of claim 1, further comprising grouping the input image with one or more images of the plurality of reference images that are similar to the input image to form a cluster of images, and assigning a label to the cluster.

13. The method of claim 1, further comprising, prior to encoding the feature vector as the similarity hash, reducing the number of components in the plurality of components using a dimensionality-reduction technique.

14. The method of claim 1, wherein the trained classifier model comprises a trained convolutional neural network (CNN).

15. The method of claim 1, further comprising:
computing one or more additional hashes of the feature vector using additional hashing techniques, each additional hash generated by a respective distinct hashing technique; and
updating the similarity hash as a combination of the similarity hash and the one or more additional hashes.

16. The method of claim 15, further comprising, prior to combining the similarity hash and the one or more additional hashes, normalizing each additional hash and the similarity hash.

17. The method of claim 16, wherein combining the similarity hash and the one or more additional hashes comprises computing a linear combination of the additional hashes and the similarity hash.

18. The method of claim 17, wherein the linear combination has a first weight associated with a first hash and a distinct second weight associated with a second hash.

19. A computer system, comprising:
one or more processors;
memory; and
one or more programs stored in the memory and configured for execution by the one or more processors, the one or more programs comprising instructions for:
receiving an input image having content;
generating a feature vector corresponding to the input image according to a trained classifier model, the feature vector having a plurality of components;
encoding the feature vector as a similarity hash by quantizing each component;
computing one or more additional hashes of the feature vector using additional hashing techniques, each additional hash generated by a respective distinct hashing technique;
updating the similarity hash as a combination of the similarity hash and the one or more additional hashes; and
for each reference image in a plurality of reference images:
obtaining a reference hash for the respective reference image;
computing similarity between the input image and the respective reference image by computing a distance between the reference hash and the similarity hash;
determining if the computed distance is within a predetermined threshold; and
in accordance with a determination that the computed distance is within the predetermined threshold, returning the respective reference image as an image that is similar to the input image.

20. A non-transitory computer readable storage medium storing one or more programs configured for execution by one or more processors of a computer system, the one or more programs comprising instructions for:
receiving an input image having content;
generating a feature vector corresponding to the input image according to a trained classifier model, the feature vector having a plurality of components;
encoding the feature vector as a similarity hash by quantizing each component;
computing one or more additional hashes of the feature vector using additional hashing techniques;
updating the similarity hash as a combination of the similarity hash and the one or more additional hashes without quantizing the one or more additional hashes; and
for each reference image in a plurality of reference images:
obtaining a reference hash for the respective reference image;
computing similarity between the input image and the respective reference image by computing a distance between the reference hash and the similarity hash;
determining if the computed distance is within a predetermined threshold; and
in accordance with a determination that the computed distance is within the predetermined threshold, returning the respective reference image as an image that is similar to the input image.

* * * * *